United States Patent
Sergeev

(10) Patent No.: US 11,261,718 B2
(45) Date of Patent: Mar. 1, 2022

(54) METHOD OF SELECTIVELY TREATING A BOTTOM HOLE REGION OF A FORMATION FOR INTENSIFYING OIL PRODUCTION

(71) Applicants: LIMITED LIABILITY COMPANY "VI-ENERGY", Moscow (RU); NISSAN CHEMICAL CORPORATION, Tokyo (JP)

(72) Inventor: Vitaly Vyacheslavovich Sergeev, Moscow (RU)

(73) Assignees: LIMITED LIABILITY COMPANY "VI-ENERGY", Moscow (RU); NISSAN CHEMICAL CORPORATION, Tokyo (JP)

(*) Notice: Subject to any disclaimer, the term of this patent is extended or adjusted under 35 U.S.C. 154(b) by 0 days.

(21) Appl. No.: 17/251,300

(22) PCT Filed: Jan. 28, 2019

(86) PCT No.: PCT/RU2019/050008
§ 371 (c)(1),
(2) Date: Dec. 11, 2020

(87) PCT Pub. No.: WO2019/245410
PCT Pub. Date: Dec. 26, 2019

(65) Prior Publication Data
US 2021/0254444 A1    Aug. 19, 2021

(30) Foreign Application Priority Data
Jun. 18, 2018   (RU) .............................. 2018122128

(51) Int. Cl.
*E21B 43/16*    (2006.01)
*E21B 43/27*    (2006.01)
(Continued)

(52) U.S. Cl.
CPC .............. *E21B 43/27* (2020.05); *C09K 8/584* (2013.01); *C09K 8/602* (2013.01); *C09K 8/74* (2013.01);
(Continued)

(58) Field of Classification Search
CPC ... C09K 8/92; C09K 8/57; C09K 8/72; C09K 2208/10; C09K 166/307; C09K 8/584;
(Continued)

(56) References Cited

U.S. PATENT DOCUMENTS 3,956,145 A * 5/1976 Christopher, Jr. ....... C09K 8/82
                                                        507/212
5,294,353 A    3/1994 Dill
(Continued)

FOREIGN PATENT DOCUMENTS

EP    0520840 A1    12/1992
RU    2184836 C2    7/2002
(Continued)

OTHER PUBLICATIONS

Jun. 13, 2019 Search Report issued in International Patent Application No. PCT/RU2019/050008.
(Continued)

*Primary Examiner* — Silvana C Runyan
(74) *Attorney, Agent, or Firm* — Oliff PLC

(57) ABSTRACT

A method of treating a bottom hole region of a formation (BRF) with an estimated frequency for performing the stages, wherein the second and each stage is carried out when the factor and/or the daily crude oil flow rate of a well has decreased by 25% or more over the preceding 6 months of well operation. In the first and second stages, the BRF is treated with an emulsion system containing silicon dioxide nanoparticles, an acid composition, and an aqueous solution of potassium or calcium chloride. In the third stages, the
(Continued)

BRF is treated with an emulsion system containing silicon dioxide nanoparticles, a composition of surfactants and alcohols, and an aqueous solution of potassium chloride or calcium chloride. The thermal stability of the emulsion system, increase the rate of development of an oil and gas bearing layer, increase the duration of a positive effect and enhance oil production.

1 Claim, 8 Drawing Sheets

(51) Int. Cl.
    *C09K 8/584*     (2006.01)
    *C09K 8/60*     (2006.01)
    *C09K 8/74*     (2006.01)

(52) U.S. Cl.
    CPC .......... *E21B 43/16* (2013.01); *C09K 2208/10* (2013.01); *C09K 2208/32* (2013.01)

(58) Field of Classification Search
    CPC ....... C09K 8/74; C09K 2208/32; E21B 43/27; E21B 43/16
    See application file for complete search history.

(56) References Cited

U.S. PATENT DOCUMENTS

| | | | |
|---|---|---|---|
| 6,068,054 | A | 5/2000 | Bragg |
| 6,790,811 | B2 | 9/2004 | Patel |
| 9,702,238 | B2 * | 7/2017 | Reddy ...................... C09K 8/74 |
| 10,377,942 | B2 * | 8/2019 | Southwell ................ C09K 8/03 |
| 2014/0116695 | A1 | 5/2014 | Maghrabi et al. |
| 2019/0241797 | A1 | 8/2019 | Sergeev |

FOREIGN PATENT DOCUMENTS

| | | | |
|---|---|---|---|
| RU | 2004 119 927 | A | 1/2006 |
| RU | 2501943 | C2 | 12/2013 |
| RU | 2579044 | C1 | 3/2016 |
| RU | 2631460 | C1 | 9/2017 |

OTHER PUBLICATIONS

Jun. 13, 2019 Written Opinion issued in International Patent Application No. PCT/RU2019/050008.

\* cited by examiner

FIG. 1

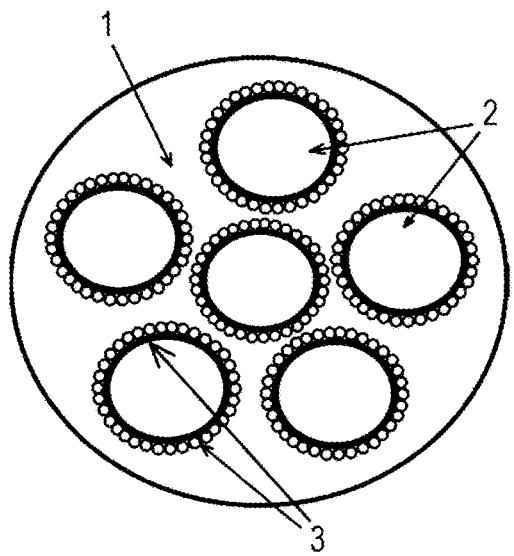

FIG. 2

| NO. | SPECIAL MACHINERY AND EQUIPMENT | MEASUREMENT UNITS | QUANTITY, PCS | INTENDED USE |
|---|---|---|---|---|
| 1 | ESPU WITH EXTERNAL PUMP AND PADDLE MIXER | PCS. | 1 | ESN PREPARATION |
| 2 | LINE (TUBES, HOSES) | SETS | 1 | WATER INFLUX AND DRAINING |
| 3 | TSA-320 | PCS. | 1 | ESN PUMPING AND PUMPING INTO WELL |
| 4 | TANKER TRUCK | PCS. | 2 | TRANSPORTING ESN AND PROCESS WATER |
| 5 | RESERVOIR (25m$^3$) | PCS. | 1 | STORING PROCESS LIQUIDS |
| 6 | AEROMETER | PCS. | 1 | MEASURING DENSITY OF LIQUIDS |

| NAME OF EQUIPMENT/SPECIAL MACHINERY | QUANTITY, PCS |
|---|---|
| TANKER TRUCK (AC-10) | 3 |
| RESERVOIR (25m³) | 1 |
| ACID UNIT (6m³) | 2 |
| TSA-320 | 2 |
| PACKER WITH HYDRO ANCHOR (PRO-YAMO-YAG/POM-YAGK) DEPENDING ON THE TECHNOLOGICAL SCHEME | 1 OR 2 |

FIG. 7

| NO. | SAMPLE | COMPOSITION, vol% | | | | TIME, h | STRATIFICATION AT 140°C, vol% |
|---|---|---|---|---|---|---|---|
| | | DIESEL FUEL | EMULSIFIER | NANOPARTICLES | CaCl$_2$, AQUEOUS SOLUTION | | |
| 1 | ES-1 | 10 | 3 | - | 87 | 12 | 68 |
| | | | | | | 24 | 70 |
| 2 | ES-2 | 20 | 3 | - | 82 | 12 | 75 |
| | | | | | | 24 | 78 |
| 3 | ESS-0-1 | 10 | 3 | 0.25 | 86.5 | 12 | 0 |
| | | | | | | 24 | 48 |
| 4 | ESS-0-2 | 20 | 3 | 0.25 | 76.75 | 12 | 0 |
| | | | | | | 24 | 55 |
| 5 | ESN-1-1 | 10 | 3 | 0,5 | 86,5 | 12 | 0 |
| | | | | | | 24 | 42 |
| 6 | ESN-1-2 | 20 | 3 | 0,5 | 81,5 | 12 | 0 |
| | | | | | | 24 | 49 |
| 7 | ESN-2-1 | 10 | 3 | 1 | 86,0 | 12 | 0 |
| | | | | | | 24 | 46 |
| 8 | ESN-2-2 | 20 | 3 | 1 | 81,0 | 12 | 0 |
| | | | | | | 24 | 51 |

METHOD OF SELECTIVELY TREATING A BOTTOM HOLE REGION OF A FORMATION FOR INTENSIFYING OIL PRODUCTION

The present invention relates to the oil industry, in particular to technologies for intensifying oil production in order to increase the rate of development of oil and gas formations and increase the oil recovery factor.

Advance water encroachment of oil and gas bearing layers is one of the most common problems reducing the efficiency of the development of oil and gas formations. The reasons for the advance water encroachment can comprise several simultaneous factors, including geological micro- and macro-heterogeneity of the formations, natural fracturing of formations in conjunction with intensive development systems, a high level of well interference, widespread introduction of hydraulic fracturing technology, etc. The main difficulty in combating advance water encroachment is that all the above factors can be simultaneously present at single process of development of layer and formation.

The experience gained in the development of oil and gas formations in the Russian Federation shows that geological micro- and macro-heterogeneity of formations, as well as their natural fracturing, are the primary factors complicating the development of formations. Said factors contribute to non-uniform distribution of filtration flows over the volume of the developed layer and to the formation of bypassed oil, which cannot be involved in the development without the use of tertiary methods of stimulating formations, including technologies for intensifying oil production.

In these conditions of development of oil and gas formations, it is necessary to use technologies for intensifying oil production, which have a selective effect. Selectivity may lie in the property of water-limiting process fluids to selectively block the most permeable water-saturated formation intervals, which ensures redistribution of filtration flows over the formation volume and the involvement of less permeable stagnant zones in the development processes.

One of the technologies of this type is disclosed by the claimant in RU 2631460 (patent holder: LLC "VI-EN-ERGY", author V. V. Sergeev, IPC E21B 43/22, E21B 43/27, published on Sep. 22, 2017), which is considered the prior art solution for the present invention. The technology consists in combining two types of treatment of the bottom hole region of a formation (BRF): water influx restriction and acid treatment of the BRF. Combining said treatments leads to a directed acid impact on less permeable intervals of the oil and gas formation. The impact is carried out in several steps: the first step is treatment of high-permeability BRF intervals with an emulsion solution (hereinafter referred to as ES), the second step is oil rim pumping, and the third step is an injection of an acid composition into low-permeability intervals of the BRF. Moreover, the wettability of the rock in the BRF is determined in advance, and in the case of hydrophilicity of the rock, a direct ES of the following composition (vol %) is used: Sinol EM or Sinol EMI emulsifier (3-5), hydrocarbon phase (diesel fuel or prepared oil from the oil gathering station) (20-25), colloidal solution of silicon dioxide nanoparticles (0.5-3), aqueous phase (the rest). In the case of hydrophobicity of the rock, an ES of the invert type in use and the following composition (vol %) is used: Sinol EM or Sinol EMI emulsifier (3-5), hydrocarbon phase (diesel fuel or prepared oil from the oil gathering station) (40-45), colloidal solution of silicon dioxide nanoparticles (1-3), aqueous phase (the rest).

According to the results of 10 months of monitoring the operation of wells treated according to the prior art oil production intensification technology, it was determined that the positive technological effect lasts 6 months on average. At the same time, it was determined using lab tests that the thermal stability of the ES has an upper limit of 90° C. (FIG. 2), and therefore the prior art technology for intensifying oil production is limited in application in high-temperature formations with formation temperature of over 90° C. Further, it is widely established that during treatment of the rock with hydrochloric or mud acid compositions, each subsequent treatment of the same interval is less effective, since after the reaction of acids with minerals of the formation, a low-permeability film of reaction products is formed on the surface of the rock, which prevents contact between acids and minerals during subsequent treatments. Therefore, the technology is limited in the number of possible repeated uses to no more than two. Moreover, the frequency of hydrochloric or mud acid treatments of the BRF is 12-16 months on average, while the period of economically feasible well operation can reach 25 years.

The disadvantage of the prior art method is the limitation for the use of the technology in high-temperature formations with formation temperature of over 90° C., as well as the limitation in the number of repeated treatments to no more than two.

RU 2501943 (IPC E21B 43/27, published on Dec. 20, 2013) discloses a method for treating the bottom hole region of an oil formation, the method including sequential injection of a hydrocarbon solution of a product based on a nonionic surfactant and an acid-containing reagent, and subsequent displacement into the formation using water. In particular, a hydrocarbon solution of an invert emulsion emulsifier is used as the hydrocarbon solution of a product based on a nonionic surfactant. Hydrochloric acid or a mixture of hydrochloric and hydrofluoric acids (mud acid) or a GK ML-brand mud acid composition can be used as the acid-containing reagent, for example.

The disadvantage of the prior art method is the injection of a hydrocarbon solution of a surfactant (SHS) into the BRF as a water-blocking composition, as it has a low dynamic viscosity (in the range of 1.27-1.85 mPa s) in formation conditions and thus does not create sufficient hydraulic resistance to prevent filtering of formation waters and injected waters. Another disadvantage is the need to hold the SHS for 1-24 hours, which significantly increases the downtime of the well maintenance.

RU 2579044 (IPC E21B 43/22, E21B 43/27, published on Mar. 27, 2017) discloses a method for treating an oil-containing formation, said method consisting in injecting a hydrocarbon liquid and a sulfuric acid solution sequentially into the borehole region. A composition containing, in particular, light oil fractions, an emulsifier, and a corrosion inhibitor is used as the hydrocarbon liquid.

The disadvantage of the prior art method is the use of a sulfuric acid solution (75-96 wt %), which is characterized by high corrosiveness towards downhole equipment and casing strings; further, the method does not include determining the volume of injected sulfuric acid and it is proposed to inject the acid into the borehole region of the formation being treated until the pH in the adjacent well drops below 6.0, which in practice cannot be controlled with sufficient accuracy.

Patent application RU 2004119927/03 (IPC E21B 43/27, published on Jun. 29, 2004) discloses a method for treating the BRF, the method consists sequential treatment of the BRF with an emulsion system and an acid composition. A composition containing a mixture of hydrochloric acid, carboxymethylcellulose and water is used as the emulsion system.

The disadvantage of this method is the use of hydrochloric acid in a mixture, and not as a separate step of treating intervals of the BRF with the acid composition with a specified concentration of the active substance. This further prevents selective treatment of the less permeable BRF channels.

EP 0520840 A1 (IPC E21B 43/27, publication date Dec. 30, 1992) discloses a method of treating the bottom hole formation region, wherein the bottom hole formation region is treated simultaneously with a composition containing an emulsion system, an acid composition and an aqueous salt solution. In particular, the composition used contains diesel fuel or oil, an emulsifier, silicon dioxide microparticles, an aqueous salt solution, hydrochloric acid and acetic acid.

The disadvantage of the prior art method is the proposed order of dispersion, which leads to coagulation of solid particles in the aqueous phase and the impossibility of preparing an emulsion with uniform dispersion; further, in one embodiment of the method it is proposed to use hydrochloric acid and other acids in a mixture, and not as a separate step of treating the BRF intervals with an acid composition with a specified concentration of the active substance, which does not provide selective treatment of less permeable BRF channels.

US 2014/0116695 A1 (IPC S09K 8/74, E21B 43/22, published on May 1, 2014), which is used as an information source herein, discloses a method of treating the bottom hole formation region, wherein the bottom hole formation region is treated simultaneously with an emulsion system, an acid composition and an aqueous salt solution. In particular, the composition used contains diesel fuel or oil, an emulsifier in the form of a cationic amine, a colloidal solution of silicon dioxide nanoparticles, an aqueous phase, 28% hydrochloric acid and a corrosion inhibitor.

The disadvantage of the prior art method is the use of hydrochloric acid in a mixture, and not as a separate step of treating intervals of the BRF with an acid composition with a specified concentration of the active substance, which ultimately reduces the efficiency of dissolving of rock minerals and does not provide selective treatment of the less permeable BRF channels.

According to the present invention, three or more stages are carried out in treating a BRF with an estimated frequency for performing the stages, wherein the second and each successive stage is carried out when the productivity factor and/or the daily crude oil flow rate of a well has decreased by 25% or more over the preceding 6 months of well operation. Thus, in the first and second stages, the BRF is treated successively with a highly stable emulsion system, an acid composition, and an aqueous solution of potassium chloride or calcium chloride, and in the third and successive stages, the BRF is treated successively with a highly stable emulsion system, a composition of surfactants and alcohols, and an aqueous solution of potassium chloride or calcium chloride. The highly stable emulsion system contains (vol %): Diesel fuel or treated oil from the oil preparation and pumping station (10-20), emulsifier (3), colloidal solution of hydrophobic silicon dioxide nanoparticles with particle size of 5 to 100 nm (0.25-1), or colloidal solution of hydrophilic silicon dioxide nanoparticles with particle size of 5 to 100 nm (0.25-1), or hydrophilic dry amorphous silicon dioxide nanoparticles with particle size of 5 to 500 nm (1-2), and an aqueous solution of calcium chloride or potassium chloride (the rest).

A composition containing (vol %): fatty acid aminoamides (43-45), amine oxide (0.7-1), and diesel fuel (the rest) is used as the emulsifier for treating a BRF with formation temperature of under 90° C.

A composition containing (vol %): fatty acid aminoamides (43-45), amine oxide (0.7-1), lime or bentonite as a high-temperature crosslinking filler (2-5) and diesel fuel (the rest) is used as the emulsifier for treating a BRF with formation temperature of over 90° C.

The colloidal solution of hydrophobic silicon dioxide nanoparticles with particle size of 5 to 100 nm contains (vol %): silicon dioxide (31-32.5), propylene glycol monomethyl ether (67-68.8), and water (the rest).

The colloidal solution of hydrophilic silicon dioxide nanoparticles with particle size of 5 to 100 nm contains (vol %): silicon dioxide (30-31) in isopropanol (67-68.5) and in methanol (the rest) or silicon dioxide (29-31) in ethylene glycol (the rest).

The acid composition for carbonate rock contains (vol %): 30% hydrochloric acid (63.5-65), acetic acid (3.5), diethylene glycol (8-9), amide-based water repellent (1.5-2), corrosion inhibitor (1.5-2), and process water (the rest). The acid composition for terrigenous rock contains (vol %): 30% hydrochloric acid (60.5-61), hydrofluoric acid (3-4), acetic acid (3.3-3.5), diethylene glycol (8-9), amide-based water repellent (1.5-2), corrosion inhibitor (1.8-2), and process water (the rest).

The composition of surfactants and alcohols contains (vol %): monoalkyl phenyl ethers of polyethylene glycol (40-41), sodium alkyliminodipropionates (2.5-3), poly glycols (15-16), and methanol (the rest).

The technical result of the claimed invention is to raise the thermal stability of the emulsion system, increase the rate of development of an oil and gas bearing formation, increase the duration of a positive effect and enhance oil production.

The invention is illustrated by the following drawings.

FIG. 1 shows a schematic representation of the structure of a highly stable emulsion system containing silicon dioxide nanoparticles (hereinafter referred to as ESN).

FIG. 2 shows a table listing machinery and equipment required for the preparation of ESN.

FIG. 7 shows a table with the results of testing thermal stability of prior art emulsions and ESN at 140° C.

Figures 3, 4:
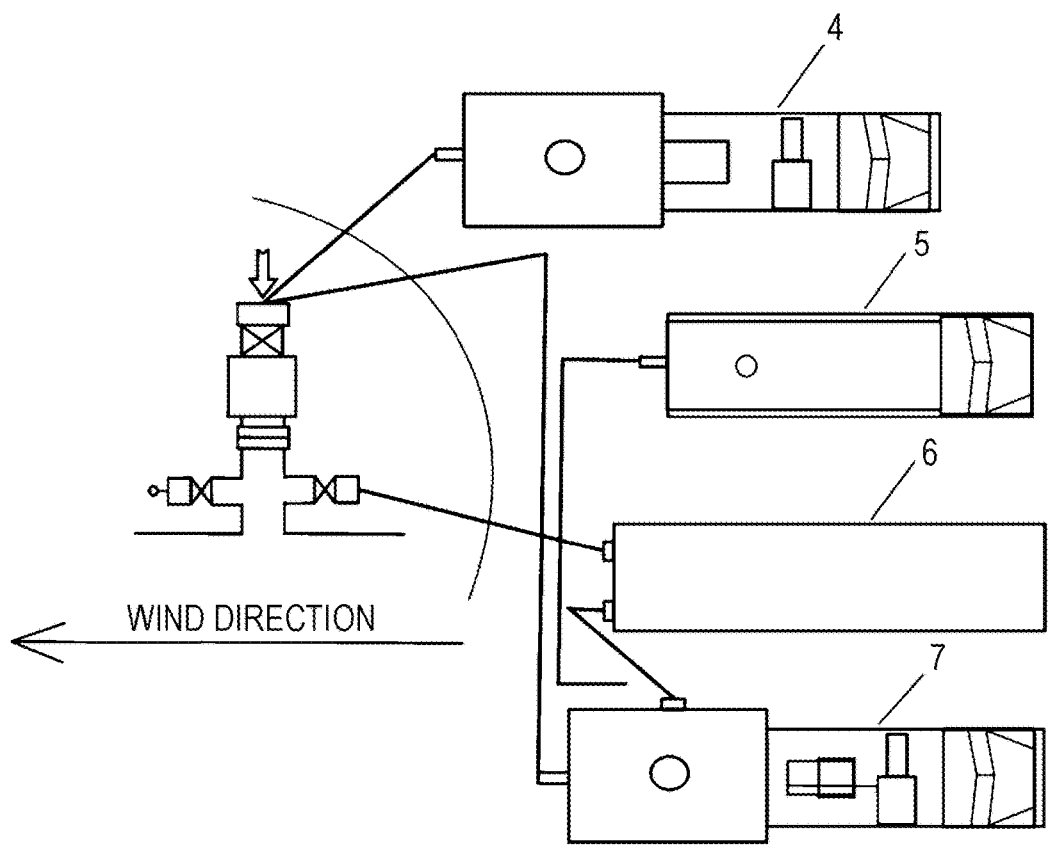
FIG. 3 shows a table listing machinery and equipment required for injecting ESN into the well.
FIG. 4 shows a diagram of the placement of special equipment in the well during treatment step.

Filtration processes of process liquids and formation fluids in porous media are determined by phenomena occurring both at the interfaces between process liquids, oil, water, and gas, and at the points of contact of process liquids and formation fluids with the rock. Therefore, the disclosed method of treating BRF for the purpose of intensifying oil production has been developed on the basis of the properties of process liquids to change and effectively adjust the molecular surface properties of the rock.

In accordance with the developed technology, BRF is treated successively in three steps of injecting process liquids with different physical and chemical properties. Moreover, three or more stages of BRF treatment are stipulated with an estimated frequency for performing the stages. Each stage of BRF treatment includes three steps of injecting process liquids into the well that are combined into a single technological process, thereby ensuring the selectivity of treatment according to the technology.

In the first step of the first and second stages, ESN is injected into the BRF in order to adjust wettability and limit injectivity of the most permeable water-saturated intervals of the BRF.

The highly stable emulsion system contains (vol %): Diesel fuel or treated oil from the oil preparation and pumping station (10-20), emulsifier (3), colloidal solution of hydrophobic silicon dioxide nanoparticles with particle size of 5 to 100 nm (0.25-1), or colloidal solution of hydrophilic silicon dioxide nanoparticles with particle size of 5 to 100 nm (0.25-1), or hydrophilic dry amorphous silicon dioxide nanoparticles with particle size of 5 to 500 nm (1-2), and an aqueous solution of calcium chloride or potassium chloride (the rest).

A composition containing (vol %): fatty acid aminoamides (43-45), amine oxide (0.7-1), and diesel fuel (the rest) is used as the emulsifier for treating BRF with formation temperature of under 90° C. A composition containing (vol %): fatty acid aminoamides (43-45), amine oxide (0.7-1), lime or bentonite as a high-temperature crosslinking filler (2-5) and diesel fuel (the rest) is used as the emulsifier for treating BRF with formation temperature of over 90° C.

The colloidal solution of hydrophobic silicon dioxide nanoparticles with particle size of 5 to 100 nm used contains (vol %): silicon dioxide (31-32.5), propylene glycol monomethyl ether (67-68.8), and water (the rest); the colloidal solution of hydrophilic silicon dioxide nanoparticles with particle size of 5 to 100 nm contains (vol %): silicon dioxide (30-31) in isopropanol (67-68.5) and in methanol (the rest) or silicon dioxide (29-31) in ethylene glycol (the rest).

High stability of the emulsion system is achieved due to the formation of an additional adsorption layer by nanoparticles, which prevents the globules of the aqueous and/or hydrocarbon phases of the emulsion from coalescing. Said additional layer is formed when silicon dioxide nanoparticles with increased surface activity are adsorbed on the adsorption-solvation layers of the globules of the aqueous and/or hydrocarbon phases of the emulsion. FIG. 1 shows a schematic representation of the ESN structure, where 1 is the hydrocarbon medium, 2 is aqueous phase globules, and 3 is the adsorption-solvation layer of silicon dioxide nanoparticles and surfactants.

The most permeable formation intervals washed with water are hydrophilic, and this hydrophilicity creates additional resistance to the movement of the predominantly hydrophobic emulsion system along them and reduces the risk of the emulsion system breaking into the depth of the formation through water-washed filtration channels.

The use of ESN as a water-limiting composition makes it possible to:
  selectively restrict water inflows from the washed most permeable BRF intervals;
  preserve filtration parameters of less permeable BRF intervals;
  temporarily block the most permeable formation intervals without causing any irreversible consequences of the impact on the formation system and the environment;
  adjust the wettability of rock surface by the hydrophobization of the pore space with surfactant components of the ESN;
  prevent complications associated with the ejection of components of water-limiting compositions into the inlet of downhole-pumping equipment;
  prevent complications associated with the processes of separating the components of water-limiting compositions in the system for collecting and preparing well products.

In the second step of the first and second stages, an acid composition is injected in order to push the ESN deep into the BRF and enhance filtration parameters of less permeable BRF intervals. A change in the contact angle of rock wettability as a result of injecting the hydrocarbon emulsion system in the first treatment step leads to additional resistance to the movement through said channels of the water-based acid composition which, under these conditions, will be filtered primarily into the less permeable intervals of the formation. Because the acid composition partially dissolve a number of bridging agents and rock minerals, the acid compositions make it possible to enhance the filtration parameters of the less-permeable intervals of the formation, thus ensuring the redistribution of filtration flows of liquids entering the BRF.

The acid composition for carbonate rock of BRF contains (vol %): 30% hydrochloric acid (63.5-65), acetic acid (3.5), diethylene glycol (8-9), amide-based water repellent (1.5-2), corrosion inhibitor (1.5-2), and process water (the rest). The acid composition for terrigenous rock of BRF contains (vol %): 30% hydrochloric acid (60.5-61), hydrofluoric acid (3-4), acetic acid (3.3-3.5), diethylene glycol (8-9), amide-based water repellent (1.5-2), corrosion inhibitor (1.8-2), and process water (the rest).

In the third step of the first and second stages, an aqueous solution of potassium chloride or calcium chloride is injected, forcing technological compositions injected into the BRF to move deeper into the BRF. Aqueous solutions of potassium chloride or calcium chloride are used (with concentration in the range of 10-100 kg/m$^3$ and solution density in the range of 1030-1350 kg/m$^3$) corresponding in their physical and chemical characteristics to the well-killing fluids used in the formation being treated.

In the third and subsequent stages, the sequence of steps of injection of process liquids into the well is preserved, but instead of an acid composition, a composition of surfactants and alcohols is used. The composition of surfactants and alcohols contains (vol %): monoalkyl phenyl ethers of polyethylene glycol (40-41), sodium alkyliminodipropionates (2.5-3), polyglycols (15-16), and methanol (the rest).

Further, the time interval between carrying out the second and subsequent stages is determined based on the specific technological parameters of the well treated in the first stage, namely, the second and each subsequent stages of BRF treatment are to be carried out when the productivity factor and/or the daily crude oil flow rate of a well has decreased by 25% or more over the preceding 6 months of well operation. The productivity factor is equal to the ratio of the daily flow rate of the well to the depression at the bottom hole, and depends on a large number of factors, including the effective thickness and permeability of the formation, the well diameter, the degree and perfection of formation penetration, the composition and viscosity of the formation fluid, the skin factor, etc.

Study of the Rheological Properties of Prior Art Emulsions and ESN in Various Temperature Modes The rheological parameters of prior art emulsions and ESN were measured using a Rheotest RN 4.1 rotational viscometer (Medingen GmbH, Germany) using a cylindrical measuring system ("cylinder-cylinder") in a shear rate range of 0.1 to 300 $s^{-1}$ at temperatures of 20 and 90° C. The measurement error is ±3%.

As a result of the measurements, the relationship of shear stress to shear rate gradient (flow curve) and of dynamic viscosity to shear rate (viscosity curve) were characterized.

In order to carry out comparative studies, samples of prior art emulsion (ES) and highly stable samples of emulsion systems containing silicon dioxide nanoparticles (ESN) were selected for rheological tests.

Rheological models were determined by mathematical processing of the obtained flow curves (dependences of shear stress on shear rate) using rheometer software. During calculations, the most appropriate model for each emulsion system was selected from the following three well-known types:

$$\text{Ostwald model (plastic fluid): } \tau = k\gamma^n, \quad (1)$$

$$\text{Bingham model (pseudoplastic fluid): } \tau = \tau_0 + \eta\gamma, \quad (2)$$

$$\text{Herschel-Bulkley model (viscoplastic fluid): } \tau = \tau_0 + K\gamma^n, \quad (3)$$

where:
K is consistency (Pa·s), a measure of consistency of the fluid (the higher the viscosity, the greater the value of this parameter);
$\gamma$ is shear strain rate, $s^{-1}$;
$\eta$ is plastic viscosity (Pa·s);
n is the non-Newtonian index which characterizes the degree of non-Newtonian behavior of the solution (the more n differs from 1, the higher the manifestation of non-Newtonian properties);
To is the yield point (Pa) which characterizes the amount of external energy required to start the fluid flow.

The results of measurements of rheological parameters are presented in FIGS. 8-11.

From the analysis of the results of the rheological parameter studies, it follows that the types of emulsion systems studied are described within the framework of the Herschel-Bulkley model (equation 3), i.e., they are "viscoplastic" fluids with a yield point.

In the systems studied, the effect of reducing viscosity under the influence of shear is reversible, and therefore the initial high viscosity is restored with a decrease in shear rate, i.e., deformed drops regain spherical shape, molecules return to their initial non-oriented state, and aggregates are restored because of Brownian motion.

The high stability of novel emulsion systems containing nanoparticles makes it possible to prolong the positive effect by more than 100%, and the surface activity of nanoparticles makes it possible to regulate the angle of selective wettability of the rock surface in the direction of philicity or phobicity, depending on the desired goal.

The rheological properties of emulsion systems make it possible to regulate shear stresses and dynamic viscosity by changing the volume of the aqueous component of the system. The ability to regulate these parameters is an important technological property that must be taken into account in conjunction with the geological and physical characteristics of the formation when projecting the impact using technologies for intensifying oil production.

Figure 12:
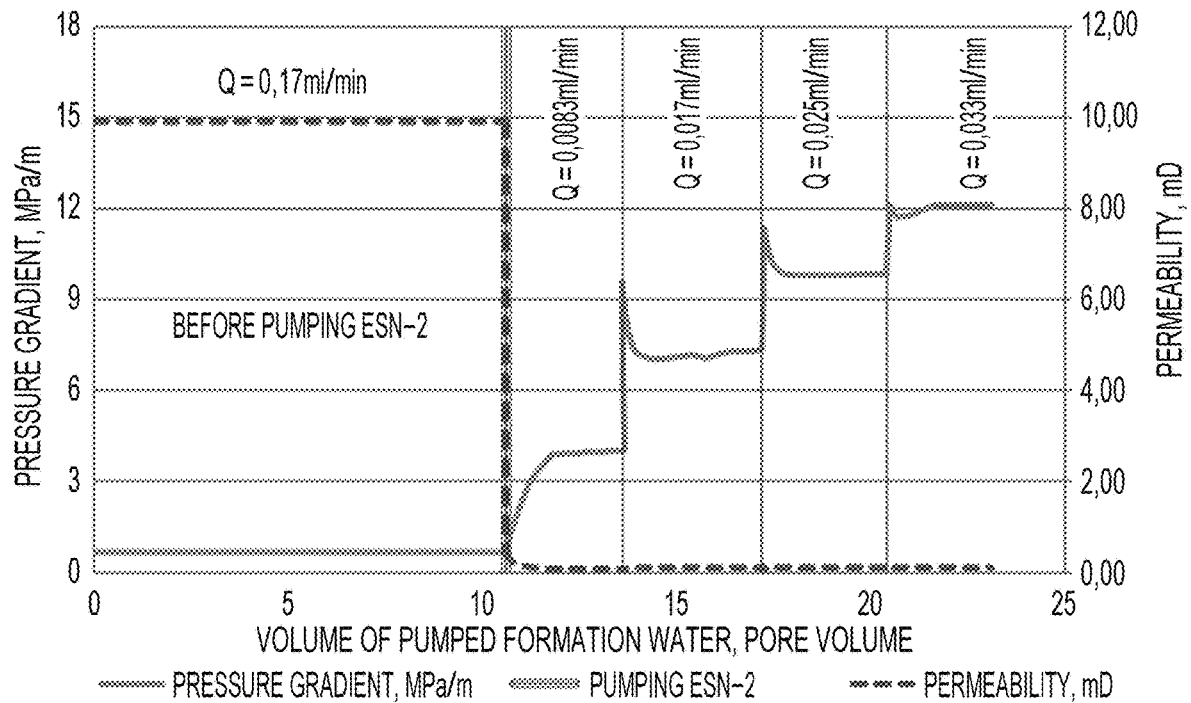
FIG. 12 shows the dynamic changes in pressure and permeability in the study of the effect of ESN on cores of carbonate rock.
Figure 13:
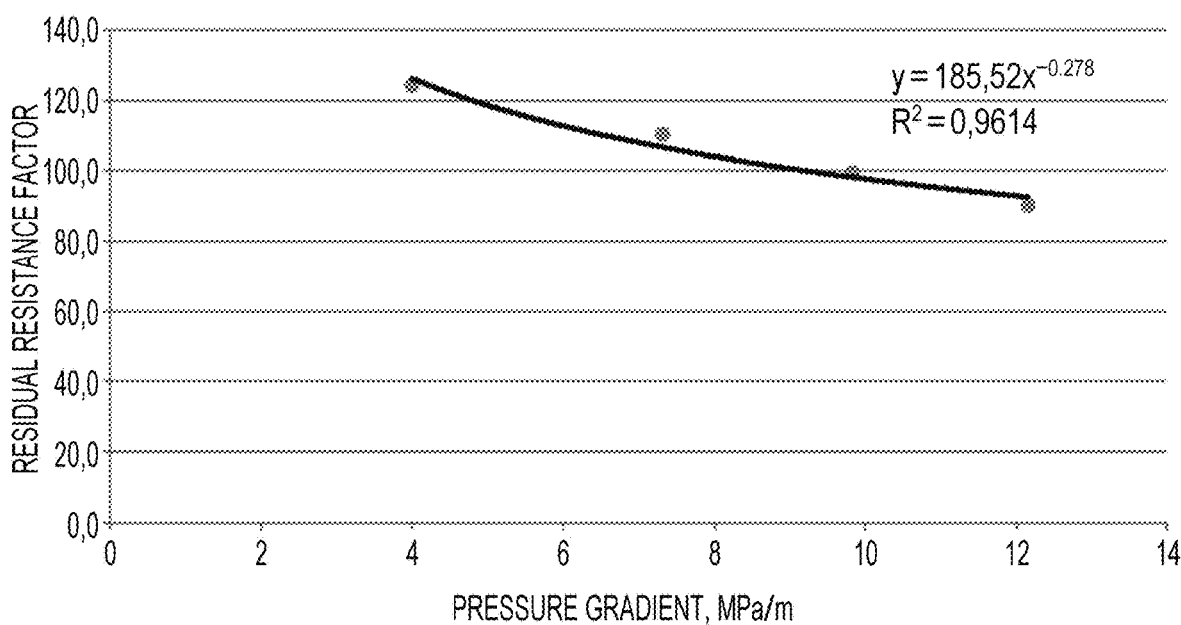
FIG. 13 shows the dependence of the ESN residual resistance factor on pressure changes in the cores of carbonate rock.

The results of filtration tests carried out using cores of carbonate rock have confirmed the high efficiency of using ESN as a selective water-limiting composition. Water-saturated cores with a residual oil saturation of no more than 20% were used in the tests. The experiments showed that after filtering one pore volume of the ESN, a decrease in core permeability by a factor of 120 was achieved (FIGS. 12, 13).

ESN Preparation

Well-killing fluid being used at a specific facility and having density of at least 1050 kg/m³ is used as the aqueous base for the preparation of ESN.

The ESN preparation is carried out using an emulsion systems preparation unit (ESPU). An ESPU is a tank with fixed mechanical paddle mixers with electric drives and, optionally, an external centrifugal pump. To ensure that stable ESN properties are obtained and maintained, use of paddle mixers with a reversible rotation direction is recommended.

The quality of ESN preparation and the stability of ESN properties depend on the completeness of the stirring of the entire volume of the preparation tank, the cleanliness of the tanks, the rate of introduction of the components and the dispersion time. Use of a tank with "beveled" corners (with a shape close to cylindrical) is recommended. The necessary equipment for ESN preparation is listed in FIG. 2.

Example of using an ESPU with an external pump and a paddle mixer.

A calculated quantity of diesel fuel or treated oil from an oil preparation and pumping station (dispersion medium) is collected in the tank for ESN preparation. Next, the centrifugal pump is started in circulation mode and the paddle mixer is set at maximum rotation speed. The minimum required rotation speed is 100 rpm.

Thereafter, calculated quantities of the following components are sequentially dispersed in the dispersion medium:
  an emulsifier, followed by stirring for 30 minutes;
  a colloidal solution of silicon dioxide nanoparticles, followed by stirring for 30 minutes;
  an aqueous solution of calcium chloride or potassium chloride, followed by stirring for at least 2 hours.

After the required viscosity and dispersion of the ESN are obtained, it is necessary to stop stirring, and after 30 minutes a control sample should be taken.

Example of Using an ESPU with a Paddle Mixer (without an External Pump)

A calculated quantity of diesel fuel or treated oil from an oil preparation and pumping station (dispersion medium) is collected in the tank for ESN preparation. Next, the paddle mixer is started and set at maximum rotation speed. The minimum required rotation speed is 100 rpm.

Thereafter, calculated volumes of the following components are sequentially dispersed in the dispersion medium:
  an emulsifier, followed by stirring for 30 minutes;
  a colloidal solution of silicon dioxide nanoparticles, followed by stirring for 30 minutes;
  an aqueous solution of calcium chloride or potassium chloride, followed by stirring for at least 3 hours.

Then the tank containing ESN is subjected to circulation for 1-2 hours using the TSA-320 pumping unit. After the viscosity and dispersion (homogeneity) of the ESN are obtained, circulation is stopped and a control sample is taken. After quality control, the ESN is transferred to a storage tank.

The ESN can be prepared prior to shipment and stored in a storage tank for 24 hours after preparation. The limitation on the shelf life of ESN is associated with the risk of stratification and potential excess viscosity gain during cooling in the winter.

If it is necessary to heat the hydrocarbon-based liquid in a storage tank at a well pad, it is preferable to carry out heating using a mobile steam unit (MSU) or a modernized mobile well dewaxing unit (MMWDU) by heating the liquid in the tank through a coil pipe mounted in the tank. MSU or MMWDU should be installed at a distance of at least 25 meters from the tank to be heated.

Quality Control of ESN Preparation

Quality control is carried out by assessing the sedimentation stability of the ESN. The test is considered successful if, after the ESN is kept at room temperature for 1 hour, the separation of the aqueous phase does not exceed 2% of the total ESN volume. If signs of settling are evident, stirring is resumed for another hour. The settling test is then repeated.

List of Equipment and Special Machinery for Well Maintenance

The list of equipment and special machinery presented in FIG. 3 is basic and may include additional elements depending on maintenance conditions, the location of the solution unit, and the technological parameters and structural features of the well.

In order to carry out maintenance according to the selective technology, one well workover team (WO) is required. The minimum well maintenance time is 60 hours, including well preparation, the injection of solutions according to the technology, and development. The layout of special machinery in the well is shown in FIG. 4, wherein 4 is an acid unit, 5 is a tanker truck, 6 is a tank, and 7 is a pump unit.

The procedure for conducting technological operations on the well.

All selective BRF treatments are carried out by the WO team.

Preparatory operations on the well.

Prior to treatment, it is necessary to ensure the cleanliness of the well bottom and BRF by carrying out the following operations:

1) Running a flow string (FS) with an open end, a drift, and a scraper for the production string (PS). Initial flushing of the well with a standard flushing solution with a gradual admission of the FS to the perforated interval and lower to the bottom of the hole with flushing fluid (which does not reduce BRF permeability due to the surfactant content of 1-2 wt %). Reaming of the packer seating interval is performed at least 5 times.

2) Cleaning asphalt-resinous-paraffin deposits (ARPD) from the FS if such deposits are present. In order to clean the ARPD from the FS, use of ML-80B or ML-81B washing solution (produced according to TU 2481-007-48482528-99) with a concentration of 5-7% is recommended. The solution must be injected into the FS when the annular well space is open. No holding time is envisaged. After the solvent mixture is injected into the FS volume, a backwash is performed.

3) Running the next line of FS (from bottom to top): funnel+FS liner+packer with hydraulic anchor+FS to the wellhead (FS size and strength group are selected depending on specific operating conditions). The funnel is mounted at the bottom of the perforated interval, and the packer is set at 20-25 m above the top of the interval being treated.

During well preparation, an estimated measurement of the injectivity of the treated well and pressure testing of the packer and the PS are performed. If well injectivity is less than 150 m$^3$/day at a pressure of 100 atm, a decision is made on preliminary well preparation by introducing an acid bath or solvent and re-perforating.

BRF Treatment Technological Operations

Figure 5:
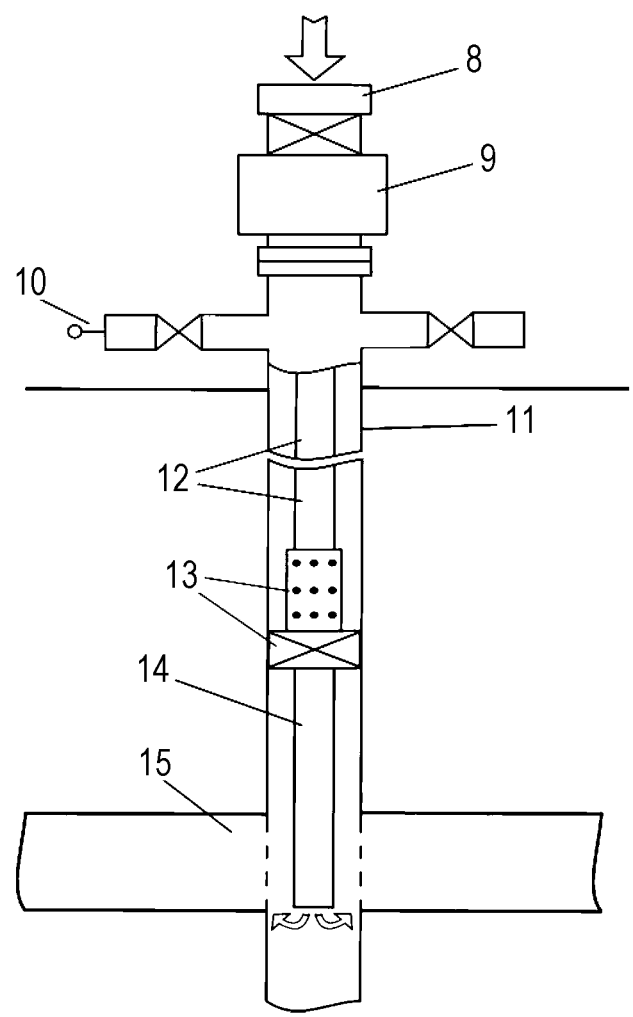
FIG. 5 shows a flow diagram of the treatment using one packer.
Figure 6:
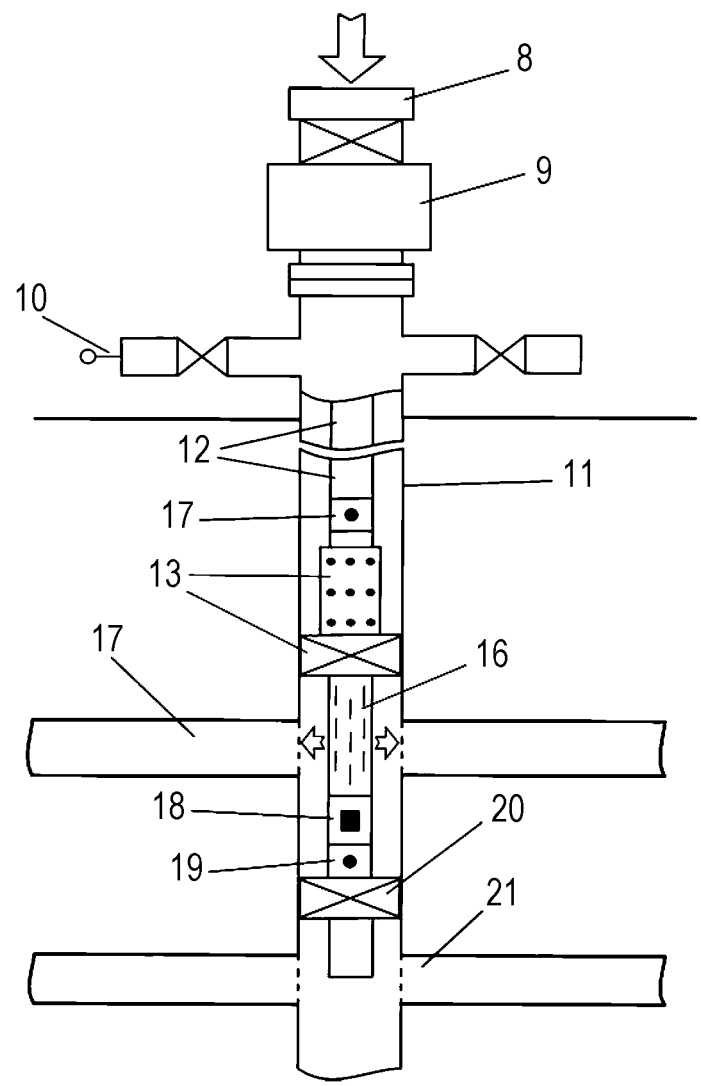
FIG. 6 shows a flow diagram of the treatment using two packers.
Figure 8:
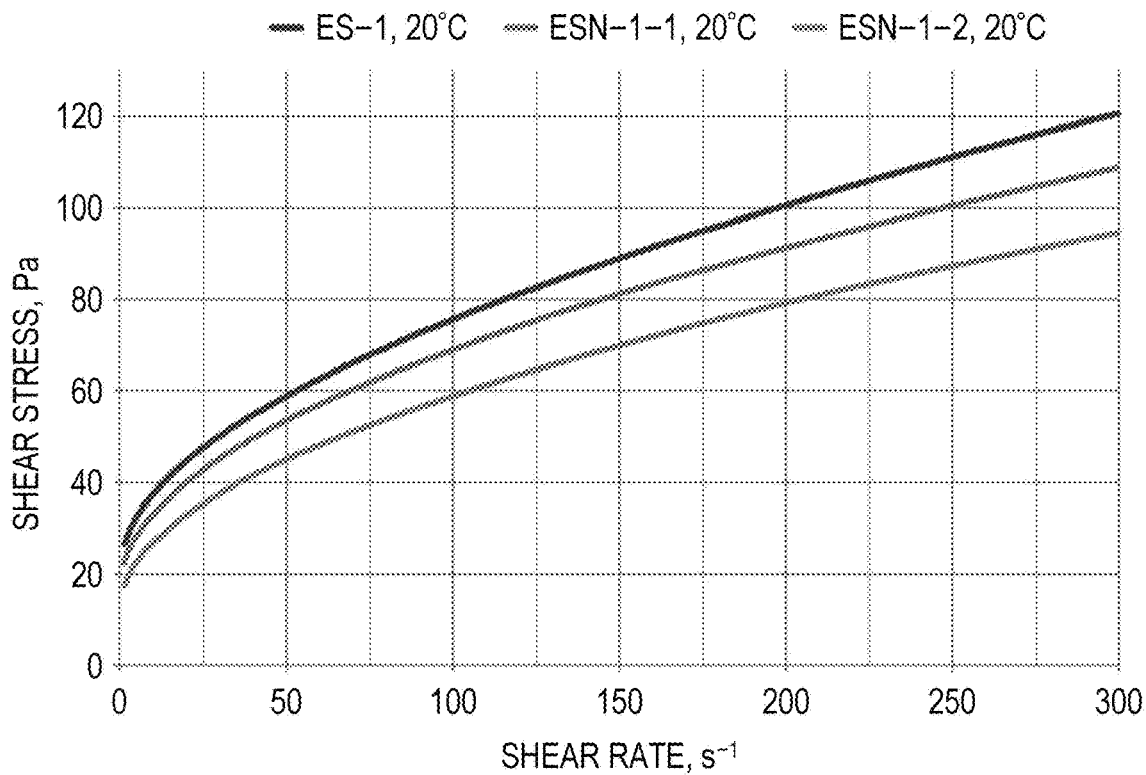
FIG. 8 shows the flow curves for samples of prior art emulsion (hereinafter referred to as ES) and ESN at 20° C.
Figure 9:
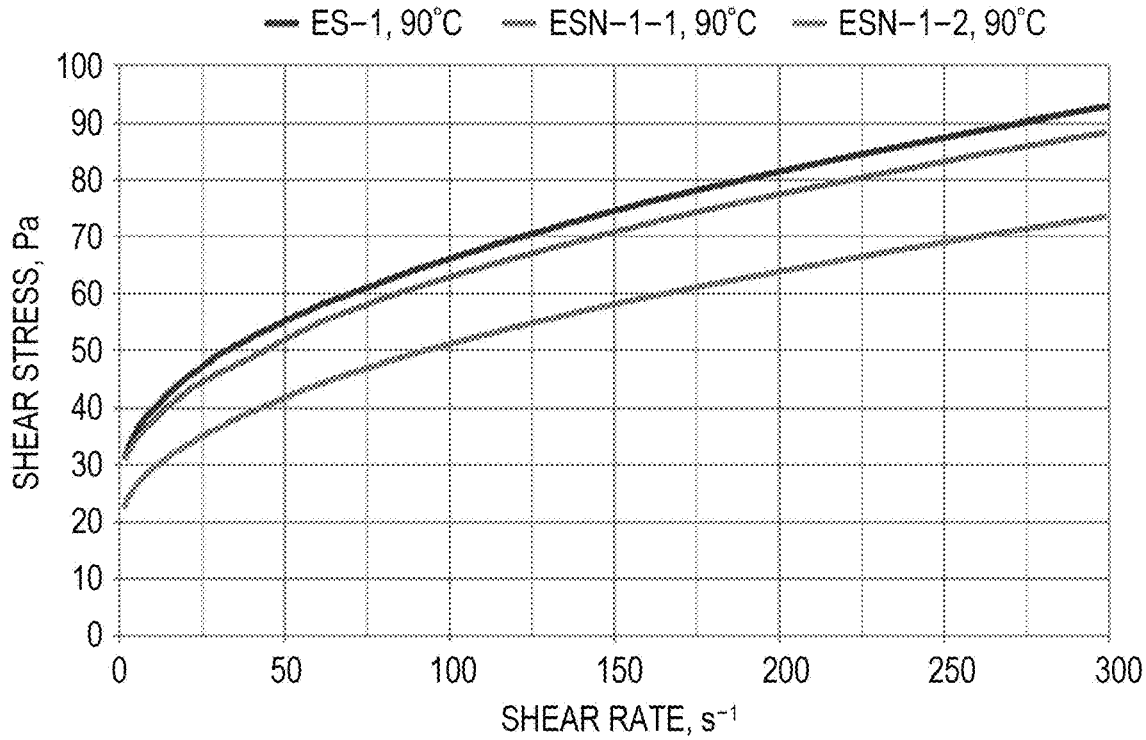
FIG. 9 shows the flow curves for the ES and ESN samples at 90° C.
Figure 10:
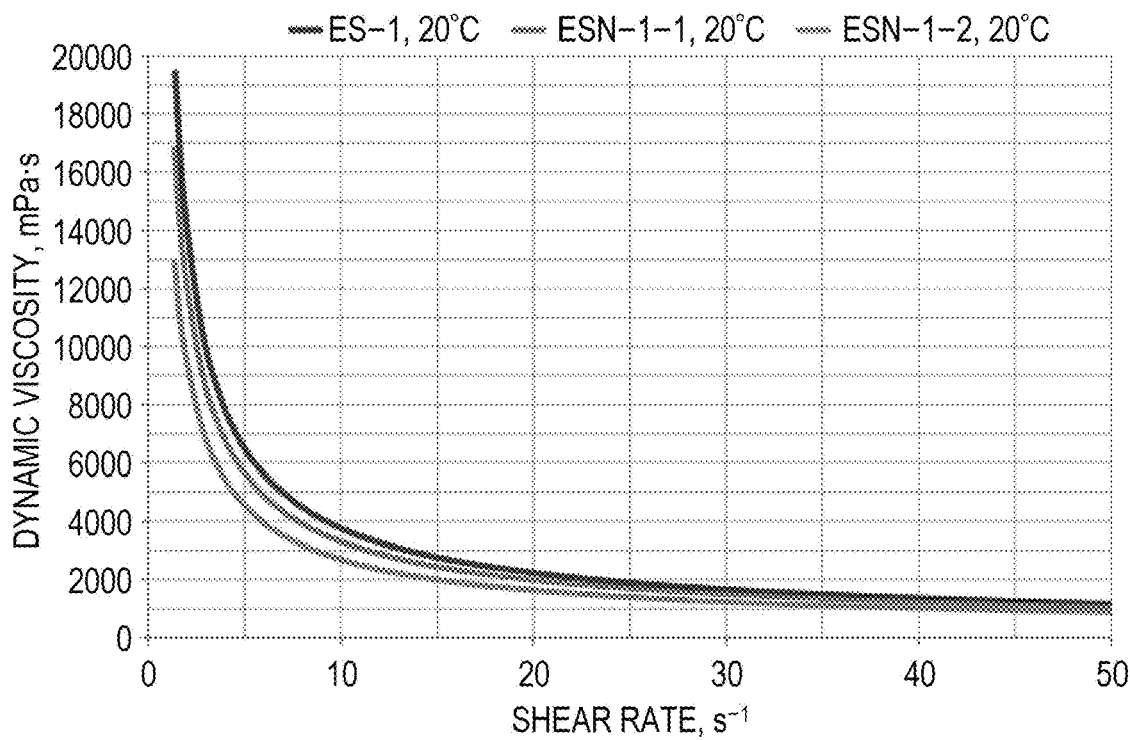
FIG. 10 shows the viscosity curves for the ES and ESN samples at 20° C.
Figure 11:
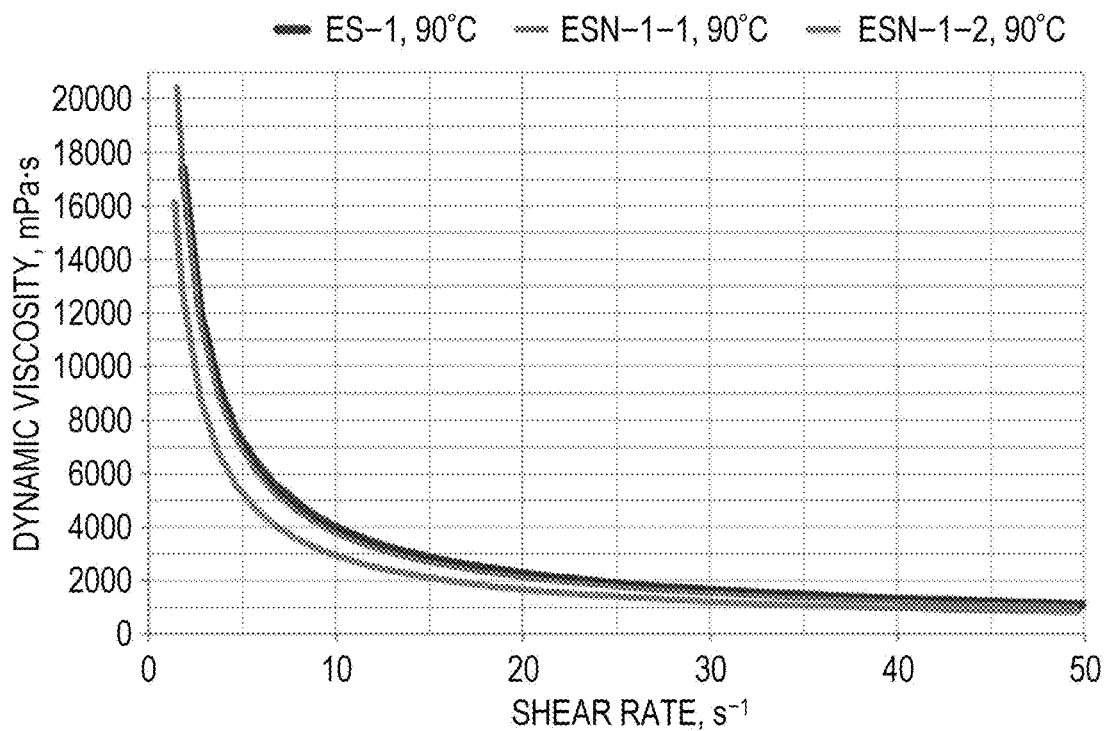
FIG. 11 shows the viscosity curves for the ES and ESN samples at 90° C.

Depending on the structural features of the well and the complexity of the target or the inadmissibility of the ingress of process liquids into the upstream or downstream objects/intervals of the BRF, two technological treatment procedure variants are envisaged and illustrated in FIGS. 5 and 6, where 8 is a buffer valve, 9 is a preventer, 10 is a pressure gauge, 11 is the production string, 12 is the FS, 13 is a packer with hydraulic anchor, 14 is a liner with funnel, 15 is a production interval, 16 is a slotted filter, 17 is a target production interval, 18 is a plug, 19 is a bypass valve, 20 is a mechanical packer, and 21 is an underlying production interval.

Following the completion of all preparatory operations, the technological operations for selective treatment of the BRF are started.

Process liquids are injected at the maximum possible flow rate and pressure. If the injection pressure reaches 80% of the maximum operating pressure of the equipment, it is necessary to reduce the flow rate and continue injecting the remaining volume of process liquids.

It is necessary to include a swab trap in the assembly run into the well.

In all stages of BRF treatment, the sequence of steps (technological operations) for injecting process liquids into the well is as follows:

1) Assembling and pressure testing the discharge line at 1.5 times the planned pressure;

2) injecting the ESN into the FS up to the FS open end (on average, half of the estimated volume of the ESN);

3) seating the packer (20-25 m above the upper perforations of the interval being treated);

4) checking the separation of the tube space and annular space (by pressure-testing along the annular space at a pressure not exceeding testing pressure of the production string).

5) continuing to inject the remaining ESN volume for displacement into the interval being treated, with constant pressure monitoring in the annular space.

6) displacing the ESN with a calculated volume of an acid composition or a surfactant composition, depending on the treatment stage;

7) displacing the process liquids in the FS (ESN+acid composition or surfactant composition) with an aqueous solution of potassium chloride or calcium chloride in the FS volume+sub-packer area;

8) closing the valve on the FS and holding the well in order for the acid or surfactant composition to react with the rock. When an acid composition is used, the holding time depends on the concentration of hydrochloric and/or hydrofluoric acids in the composition, and in some cases is not envisaged. The exact holding time is determined from the results of lab tests on the dissolution of the rock core by the acid composition or changes in the wettability of the rock caused by the surfactant composition.

Wind-Up Operations:

1) Swabbing the well in the required volume or using another available method for removing reaction products from the BRF and developing the well.

2) Lifting the FS, running the pumping equipment and putting the well into operation.

When carrying out the operations, it is necessary to adhere to safety and environmental protection requirements in accordance with industrial safety rules. Examples of implementation of the method Example 1

Treatment of BRF consisting of carbonate rock with formation temperature of 72° C.

First Stage.

Before implementing the method, the well was prepared for treatment in order to ensure cleanliness of the bottom hole and the BRF. For this purpose, the following technological operations were carried out:

running the FS with a open end to the artificial bottom hole;

flushing the well with a mineralized solution with a gradual admission of the FS to the perforated interval, and lower to the bottom hole with flushing fluid with increased sand-holding properties, the fluid not reducing BRF permeability due to the surfactant content.

An FS open end was mounted in the interval 2 m below the BRF interval being treated.

Following the completion of all preparatory operations in accordance with the well workover plan, technological operations were started to implement the method:

1) ESN was injected in a volume of 1.5 m$^3$ per meter of perforated capacity of the interval being treated (m$^3$/m) and the packer was seated in the following sequence:

ESN was injected up to a level of 22 m above the upper perforations of the interval being treated (on average, half of the estimated ESN volume). ESN contains (vol %): treated oil from the oil preparation and pumping station (15), emulsifier (3), colloidal solution of hydrophobic silicon dioxide nanoparticles with particle size of 5 to 100 nm (0.4), and an aqueous solution of calcium chloride with a density of 1173 kg/m$^3$ (81.6). The emulsifier contains (vol %): fatty acid aminoamides (43), amine oxide (0.7), and diesel fuel (56.3). The colloidal solution of hydrophobic silicon dioxide nanoparticles with particle size of 5 to 100 nm contains (vol %): silicon dioxide (31), propylene glycol monomethyl ether (68.8), and water (0.2).

The packer was seated (20 m above the upper perforations).

The remaining ESN volume was injected for further displacement into the interval being treated.

2) The ESN in the FS string and the sub-packer area was displaced with an acid composition at a volume of 1 m$^3$/m. An acid composition with the following composition was used (vol %): 30% hydrochloric acid (63.5), acetic acid (3.5), diethylene glycol (8), amide-based water repellent (1.5), Sinol IK-001 corrosion inhibitor (TU 20.59.59-130-56856807-2018) (1.5), and process water (22).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of calcium chloride with a density of 1162 kg/m$^3$ up to the FS open end.

4) The FS valve was closed. No holding time was provided.

Wind-up operations were carried out in accordance with the workover plan.

Second Stage.

After 10 months, a decrease in the daily oil flow rate of the well by over 25% was observed with a decrease in the productivity factor of under 25% over a period of 6 months.

All technological steps for the implementation of the method were carried out in the order indicated in first stage of Example 1. For Example 1, only differences in volumes and types of injected process liquids will be stated hereinafter.

Technological Operations:

1) ESN was injected in a volume of 1.7 m$^3$/m and the packer was seated in the following sequence:

ESN was injected up to a level of 22 m above the upper perforations of the interval being treated (on average, half of the estimated ESN volume). ESN contains (vol %): diesel fuel (13), emulsifier (3), colloidal solution of hydrophobic silicon dioxide nanoparticles with particle size of 5 to 100 nm (0.3), and an aqueous solution of calcium chloride with a density of 1172 kg/m$^3$ (83.7). The emulsifier contains (vol %): fatty acid aminoamides (43.5), amine oxide (0.85), and diesel fuel (55.65). The colloidal solution of hydrophobic silicon dioxide nanoparticles with particle size of 5 to 100 nm contains (vol %): silicon dioxide (31.8), propylene glycol monomethyl ether (68.15), and water (0.05).

The packer was seated (20 m above the upper perforations).

The remaining ESN volume was injected for further displacement into the interval being treated.

2) ESN in the FS string and the sub-packer area was displaced with an acid composition in a volume of 1.4 m$^3$/m. An acid composition with the following composition was used (vol %): 30% hydrochloric acid (64.5), acetic acid (3.5), diethylene glycol (9), amide-based water repellent (1.8), Sinol IK-001 corrosion inhibitor (TU 20.59.59-130-56856807-2018) (2), and process water (19.2).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of calcium chloride of with a density of 1160 kg/m$^3$ up to the FS open end.

4) The FS valve was closed. No holding time was provided.

Wind-up operations were carried out in accordance with the workover plan.

Third Stage.

After 9 months, a decrease in the daily oil flow rate of the well by over 25% was observed with a decrease in the productivity factor of over 25% over a period of 6 months.

Technological Operations:

1) ESN was injected in a volume of 1 m$^3$/m and the packer was seated in the following sequence:

ESN was injected up to a level of 23 m above the upper perforations of the interval being treated (on average, half of the estimated ESN volume). ESN contains (vol %): treated oil from the oil preparation and pumping station (16), emulsifier (3), colloidal solution of hydrophobic silicon dioxide nanoparticles with particle size of 5 to 100 nm (0.25), and an aqueous solution of calcium chloride with a density of 1173 kg/m³ (80.75). The emulsifier contains (vol %): fatty acid aminoamides (45), amine oxide (1), and diesel fuel (54). The colloidal solution of hydrophobic silicon dioxide nanoparticles with particle size of 5 to 100 nm contains (vol %): silicon dioxide (32.5), propylene glycol monomethyl ether (67), and water (0.5).

The packer was seated (21 m above the upper perforations).

The remaining ESN volume was injected for further displacement into the interval being treated.

2) ESN in the FS string and the sub-packer area was displaced with a surfactant composition in a volume of 1.5 m³/m. A surfactant composition of the following composition (vol %) was used: monoalkyl phenyl ethers of polyethylene glycol (40), sodium alkyliminodipropionates (2.5), polyglycols (15), and methanol (42.5).

During displacement, the surfactant composition was injected to the level of the FS open end. The pressure during displacement of the last portion of ESN into the formation was set at a level not exceeding safe pressure on the casing string.

3) The liquids in the FS (ESN+surfactant composition) were displaced with an aqueous solution of calcium chloride with a density of 1150 kg/m³ up to the FS open end.

4) The FS valve was closed and the well was left for 1 hour in order for the surfactant composition to react with the rock.

Wind-up operations were carried out in accordance with the workover plan.

As a result of the treatments, an increase in the daily oil flow rate of the well was achieved in the range of 80-90%.

Example 2

Treatment of BRF consisting of terrigenous rock with formation temperature of 74° C.

First Stage.

All technological steps for the implementation of the method were carried out in the order indicated in Example 1. Only differences in volumes and types of injected process liquids will be stated hereinafter.

Technological Operations for the Implementation of the Method:

1) ESN was injected in a volume of 1.1 m³/m and the packer was seated in the following sequence:

ESN was injected up to a level of 25 m above the upper perforations of the interval being treated (on average, half of the estimated ESN volume). ESN contains (vol %): diesel fuel (18), emulsifier (3), colloidal solution of hydrophilic silicon dioxide nanoparticles with particle size of 5 to 100 nm (0.25), and an aqueous solution of potassium chloride with a density of 1200 kg/m³ (78.75). The emulsifier contains (vol %): fatty acid aminoamides (45), amine oxide (0.9), and diesel fuel (54.1). The colloidal solution of hydrophilic silicon dioxide nanoparticles with particle size of 5 to 100 nm contains (vol %): silicon dioxide (30) in isopropanol (67) and in methanol (3).

The packer was seated (22 m above the upper perforations).

The remaining ESN volume was injected for further displacement into the interval being treated.

2) ESN in the FS string and the sub-packer area was displaced with an acid composition in a volume of 1.3 m³/m.

An acid composition with the following composition was used (vol %): 30% hydrochloric acid (60.5), hydrofluoric acid (3), acetic acid (3.3), diethylene glycol (8), amide-based water repellent (1.7), Sinol-IKK corrosion inhibitor (TU 2482-002-48482528-98) (1.9), and process water (21.6).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of potassium chloride with a density of 1187 kg/m³ up to the FS open end.

4) The FS valve was closed. No holding was provided.

Wind-up operations were carried out in accordance with the workover plan.

Second Stage.

After 13 months, a decrease in the oil flow rate of the well by over 25% was observed with a decrease in the productivity factor of under 25% over a period of 6 months.

Technological Operations:

1) ESN was injected in a volume of 1.7 m³/m and the packer was seated in the following sequence:

ESN was injected up to a level of 22 m above the upper perforations of the interval being treated (on average, half of the estimated ESN volume). ESN contains (vol %): treated oil from the oil preparation and pumping station (15), emulsifier (3), colloidal solution of hydrophilic silicon dioxide nanoparticles with particle size of 5 to 100 nm (0.25), and an aqueous solution of potassium chloride with a density of 1200 kg/m³ (81.75). The emulsifier contains (vol %): fatty acid aminoamides (43.5), amine oxide (0.95), and diesel fuel (55.55). The colloidal solution of hydrophilic silicon dioxide nanoparticles with particle size of 5 to 100 nm contains (vol %): silicon dioxide (31) in isopropanol (68.5) and in methanol (0.5).

The packer was seated (20 m above the upper perforations).

The remaining ESN volume was injected for further displacement into the interval being treated.

2) ESN in the FS string and the sub-packer area was displaced with an acid composition in a volume of 1.8 m³/m. An acid composition with the following composition was used (vol %): 30% hydrochloric acid (60.8), hydrofluoric acid (3), acetic acid (3.5), diethylene glycol (8.7), amide-based water repellent (1.5), Sinol-IKK corrosion inhibitor (TU 2482-002-48482528-98) (2), and process water (21.5).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of calcium chloride with a density of 1190 kg/m³ up to the FS open end.

4) The FS valve was closed. No holding time was provided.

Wind-up operations were carried out in accordance with the workover plan.

Third Stage.

After 12 months, a decrease in the oil flow rate of the well by over 25% was observed with a decrease in the productivity factor of over 25% over a period of 6 months.

Technological Operations:

1) ESN was injected in a volume of 1.2 m³/m and the packer was seated in the following sequence:

ESN was injected up to a level of 25 m above the upper perforations of the interval being treated (on average, half of the estimated ESN volume). ESN contains (vol %): treated oil from the oil preparation and pumping station (20), emulsifier (3), colloidal solution of hydrophilic silicon dioxide nanoparticles with particle size of 5 to 100 nm (0.25), and an aqueous solution of potassium chloride with a density of 1205 kg/m³ (76.75). The emulsifier contains (vol %): fatty acid aminoamides (43), amine oxide (1), and diesel fuel (56). The colloidal solution of hydrophilic silicon dioxide nanoparticles with particle size of 5 to 100 nm contains (vol %): silicon dioxide (30.6) in isopropanol (67.5) and in methanol (1.9).

The packer was seated (23 m above the upper perforations).

The remaining ESN volume was injected for further displacement into the interval being treated.

2) ESN in the FS string and the sub-packer area was displaced with a surfactant composition in a volume of 1.5 m³/m. A surfactant composition of the following composition (vol %) was used: monoalkyl phenyl ethers of polyethylene glycol (40.6), sodium alkyliminodipropionates (2.8), polyglycols (15.7), and methanol (40.9).

During displacement, the surfactant composition was injected to the level of the FS open end. The pressure during displacement of the last portion of ESN into the formation was set at a level not exceeding safe pressure on the casing string.

3) The liquids in the FS (ESN+surfactant composition) were displaced with an aqueous solution of potassium chloride with a density of 1190 kg/m³ up to the FS open end.

4) The FS valve was closed and the well was left for 1.5 hours in order for the surfactant composition to react with the rock.

Wind-up operations were carried out in accordance with the workover plan.

As a result of the treatments, an increase in the daily oil flow rate of the well was achieved in the range of 140-145%.

Example 3

Treatment of BRF consisting of carbonate rock with formation temperature of 96° C.

First Stage.

Technological Operations for the Implementation of the Method:

1) ESN was injected in a volume of 1.2 m³/m and the packer was seated in the following sequence:

ESN was injected up to a level of 24 m above the upper perforations of the interval being treated (on average, half of the estimated ESN volume). ESN contains (vol %): treated oil from the oil preparation and pumping station (17), emulsifier (3), colloidal solution of hydrophobic silicon dioxide nanoparticles with particle size of 5 to 100 nm (0.3), and an aqueous solution of calcium chloride with a density of 1155 kg/m³ (79.7). The emulsifier contains (vol %): fatty acid aminoamides (43), amine oxide (0.7), high-temperature crosslinking filler (lime) (2) and diesel fuel (54.3). The colloidal solution of hydrophobic silicon dioxide nanoparticles with particle size of 5 to 100 nm contains (vol %): silicon dioxide (31), propylene glycol monomethyl ether (68.7), and water (0.3).

The packer was seated (23 m above the upper perforations).

The remaining ESN volume was injected for further displacement into the interval being treated.

2) ESN in the FS string and the sub-packer area was displaced with an acid composition in a volume of 1.5 m³/m. An acid composition with the following composition was used (vol %): 30% hydrochloric acid (63.5), acetic acid (3.5), diethylene glycol (8), amide-based water repellent (1.5), Sinol IK-001 corrosion inhibitor (TU 20.59.59-130-56856807-2018) (1.5), and process water (22).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of calcium chloride with a density of 1140 kg/m³ up to the FS open end.

4) The FS valve was closed. No holding time was provided.

Wind-up operations were carried out in accordance with the workover plan.

Second Stage.

After 9 months, a decrease in the oil flow rate of the well by over 25% was observed with a decrease in the productivity factor of under 25% over a period of 6 months.

Technological Operations:

1) ESN was injected in a volume of 2 m³/m and the packer was seated in the following sequence:

ESN was injected up to a level of 22 m above the upper perforations of the interval being treated (on average, half of the estimated ESN volume). ESN contains (vol %): treated oil from the oil preparation and pumping station (15), emulsifier (3), colloidal solution of hydrophobic silicon dioxide nanoparticles with particle size of 5 to 100 nm (0.3), and an aqueous solution of calcium chloride with a density of 1157 kg/m³ (81.7). The emulsifier contains (vol %): fatty acid aminoamides (43.5), amine oxide (0.85), high-temperature crosslinking filler (lime) (3) and diesel fuel (52.65). The colloidal solution of hydrophobic silicon dioxide nanoparticles with particle size of 5 to 100 nm contains (vol %): silicon dioxide (31.8), propylene glycol monomethyl ether (68), and water (0.2).

The packer was seated (20 m above the upper perforations).

The remaining ESN volume was injected for further displacement into the interval being treated.

2) ESN in the FS string and the sub-packer area was displaced with an acid composition in a volume of 1.6 m³/m. An acid composition with the following composition was used (vol %): 30% hydrochloric acid (64.5), acetic acid (3.5), diethylene glycol (9), amide-based water repellent (1.8), Sinol IK-001 corrosion inhibitor (TU 20.59.59-130-56856807-2018) (2), and process water (19.2).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of calcium chloride with a density of 1148 kg/m³ up to the FS open end.

4) The FS valve was closed. No holding time was provided.

Wind-up operations were carried out in accordance with the workover plan.

Third Stage.

After 9 months, a decrease in the oil flow rate of the well by over 25% was observed with a decrease in the productivity factor of over 25% over a period of 6 months.

Technological Operations:

1) ESN was injected in a volume of 1.5 m³/m and the packer was seated in the following sequence:

ESN was injected up to a level of 23 m above the upper perforations of the interval being treated (on average, half of the estimated ESN volume). ESN contains (vol %): treated oil from the oil preparation and pumping station (16), emulsifier (3), colloidal solution of hydrophobic silicon dioxide nanoparticles with particle size of 5 to 100 nm (0.25), and an aqueous solution of calcium chloride with a density of 1158 kg/m³ (80.75). The emulsifier contains (vol %): fatty acid aminoamides (44.5), amine oxide (0.8), high-temperature crosslinking filler (lime) (4.5) and diesel fuel (50.2).

The colloidal solution of hydrophobic silicon dioxide nanoparticles with particle size of 5 to 100 nm contains (vol %): silicon dioxide (32.5), propylene glycol monomethyl ether (67), and water (0.5).

The packer was seated (21 m above the upper perforations).

The remaining ESN volume was injected for further displacement into the interval being treated.

2) ESN in the FS string and the sub-packer area was displaced with a surfactant composition in a volume of 1.2 m³/m. A surfactant composition of the following composition (vol %) was used: monoalkyl phenyl ethers of polyethylene glycol (40), sodium alkyliminodipropionates (2.5), polyglycols (15), and methanol (42.5).

During displacement, the surfactant composition was injected to the level of the FS open end. The pressure during displacement of the last portion of ESN into the formation was set at a level not exceeding safe pressure on the casing string.

3) The liquids in the FS (ESN+surfactant composition) were displaced with an aqueous solution of calcium chloride with a density of 1146 kg/m³ up to the FS open end.

4) The FS valve was closed and the well was left for 1 hour in order for the surfactant composition to react with the rock.

Wind-up operations were carried out in accordance with the workover plan.

As a result of the treatments, an increase in the daily oil flow rate of the well was achieved in the range of 92-98%.

Example 4

Treatment of BRF consisting of terrigenous rock with formation temperature of 123° C.

First Stage.

Technological Operations for the Implementation of the Method:

1) ESN was injected in a volume of 1 m³/m and the packer was seated in the following sequence:

ESN was injected up to a level of 25 m above the upper perforations of the interval being treated (on average, half of the estimated ESN volume). ESN contains (vol %): diesel fuel (10), emulsifier (3), colloidal solution of hydrophilic silicon dioxide nanoparticles with particle size of 5 to 100 nm (0.25), and an aqueous solution of potassium chloride with a density of 1200 kg/m³ (86.75). The emulsifier contains (vol %): fatty acid aminoamides (45), amine oxide (0.9), high-temperature crosslinking filler (bentonite) (5) and diesel fuel (49.1).

The colloidal solution of hydrophilic silicon dioxide nanoparticles with particle size of 5 to 100 nm contains (vol %): silicon dioxide (30) in isopropanol (67) and in methanol (3).

The packer was seated (22 m above the upper perforations).

The remaining ESN volume was injected for further displacement into the interval being treated.

2) ESN in the FS string and the sub-packer area was displaced with an acid composition in a volume of 1.4 m³/m. An acid composition with the following composition was used (vol %): 30% hydrochloric acid (60.5), hydrofluoric acid (3), acetic acid (3.3), diethylene glycol (8), amide-based water repellent (1.7), Sinol-IKK corrosion inhibitor (TU 2482-002-48482528-98) (1.9), and process water (21.6).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of potassium chloride with a density of 1193 kg/m³ up to the FS open end.

4) The FS valve was closed. No holding was provided.

Wind-up operations were carried out in accordance with the workover plan.

Second Stage.

After 11 months, a decrease in the oil flow rate of the well by over 25% was observed with a decrease in the productivity factor of under 25% over a period of 6 months.

Technological Operations:

1) ESN was injected in a volume of 1.2 m³/m and the packer was seated in the following sequence:

ESN was injected up to a level of 22 m above the upper perforations of the interval being treated (on average, half of the estimated ESN volume). ESN contains (vol %): diesel fuel (13), emulsifier (3), colloidal solution of hydrophilic silicon dioxide nanoparticles with particle size of 5 to 100 nm (0.3), and an aqueous solution of potassium chloride with a density of 1203 kg/m³ (83.7). The emulsifier contains (vol %): fatty acid aminoamides (43.5), amine oxide (0.95), high-temperature crosslinking filler (bentonite) (4.5) and diesel fuel (51.05). The colloidal solution of hydrophilic silicon dioxide nanoparticles with particle size of 5 to 100 nm contains (vol %): silicon dioxide (31) in isopropanol (68.5) and in methanol (0.5).

The packer was seated (20 m above the upper perforations).

The remaining ESN volume was injected for further displacement into the interval being treated.

2) ESN in the FS string and the sub-packer area was displaced with an acid composition in a volume of 1.4 m³/m. An acid composition with the following composition was used (vol %): 30% hydrochloric acid (60.8), hydrofluoric acid (3), acetic acid (3.5), diethylene glycol (8.7), amide-based water repellent (1.5), Sinol-IKK corrosion inhibitor (TU 2482-002-48482528-98) (2), and process water (21.5).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of calcium chloride with a density of 1196 kg/m³ up to the FS open end.

4) The FS valve was closed. No holding time was provided.

Wind-up operations were carried out in accordance with the workover plan.

Third Stage.

After 12 months, a decrease in the oil flow rate of the well by over 25% was observed with a decrease in the productivity factor of over 25% over a period of 6 months.

Technological Operations:

1) ESN was injected in a volume of 1 m³/m and the packer was seated in the following sequence:

ESN was injected up to a level of 25 m above the upper perforations of the interval being treated (on average, half of the estimated ESN volume). ESN contains (vol %): treated oil from the oil preparation and pumping station (18), emulsifier (3), colloidal solution of hydrophilic silicon dioxide nanoparticles with particle size of 5 to 100 nm (0.3), and an aqueous solution of potassium chloride with a density of 1205 kg/m³ (78.7). The emulsifier contains (vol %): fatty acid aminoamides (43), amine oxide (1), high-temperature crosslinking filler (bentonite) (4) and diesel fuel (52). The colloidal solution of hydrophilic silicon dioxide nanoparticles with particle size of 5 to 100 nm contains (vol %): silicon dioxide (30.6) in isopropanol (67.5) and in methanol (1.9).

The packer was seated (23 m above the upper perforations).

The remaining ESN volume was injected for further displacement into the interval being treated.

2) ESN in the FS string and the sub-packer area was displaced with a surfactant composition in a volume of 1.5 m³/m. A surfactant composition of the following composition (vol %) was used: monoalkyl phenyl ethers of polyethylene glycol (40.6), sodium alkyliminodipropionates (2.8), polyglycols (15.7), and methanol (40.9).

During displacement, the surfactant composition was injected to the level of the FS open end. The pressure during displacement of the last portion of ESN into the formation was set at a level not exceeding safe pressure on the casing string.

3) The liquids in the FS (ESN+surfactant composition) were displaced with an aqueous solution of potassium chloride with a density of 1197 kg/m³ up to the FS open end.

4) The FS valve was closed and the well was left for 1 hour in order for the surfactant composition to react with the rock.

Wind-up operations were carried out in accordance with the workover plan.

As a result of the treatments, an increase in the daily oil flow rate of the well was achieved in the range of 84-95%.

Example 5

Treatment of BRF consisting of carbonate rock with formation temperature of 73° C.

First Stage.

Technological Operations for the Implementation of the Method:

1) ESN was injected in a volume of 2.5 m³ per meter of perforated capacity of the interval being treated (m³/m) and the packer was seated in the following sequence:

ESN was injected up to a level of 22 m above the upper perforations of the interval being treated (on average, half of the estimated ESN volume). ESN contains (vol %): treated oil from the oil preparation and pumping station (15), emulsifier (3), colloidal solution of hydrophobic silicon dioxide nanoparticles with particle size of 5 to 100 nm (1), and an aqueous solution of calcium chloride with a density of 1170 kg/m³ (81). The emulsifier contains (vol %): fatty acid aminoamides (43), amine oxide (0.7), and diesel fuel (56.3). The colloidal solution of hydrophobic silicon dioxide nanoparticles with particle size of 5 to 100 nm contains (vol %): silicon dioxide (31), propylene glycol monomethyl ether (68.8), and water (0.2).

The packer was seated (20 m above the upper perforations).

The remaining ESN volume was injected for further displacement into the interval being treated.

2) ESN in the FS string and the sub-packer area was displaced with an acid composition in a volume of 1 m³/m. An acid composition with the following composition was used (vol %): 30% hydrochloric acid (63.5), acetic acid (3.5), diethylene glycol (8), amide-based water repellent (1.5), Sinol IK-001 corrosion inhibitor (TU 20.59.59-130-56856807-2018) (1.5), and process water (22).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of calcium chloride with a density of 1160 kg/m³ up to the FS open end.

4) The FS valve was closed. No holding time was provided.

Wind-up operations were carried out in accordance with the workover plan.

Second Stage.

After 13 months, a decrease in the daily oil flow rate of the well by over 25% was observed with a decrease in the productivity factor of under 25% over a period of 6 months.

Technological Operations:

1) ESN was injected in a volume of 2.7 m³/m and the packer was seated in the following sequence:

ESN was injected up to a level of 22 m above the upper perforations of the interval being treated (on average, half of the estimated ESN volume). ESN contains (vol %): diesel fuel (13), emulsifier (3), colloidal solution of hydrophobic silicon dioxide nanoparticles with particle size of 5 to 100 nm (0.8), and an aqueous solution of calcium chloride with a density of 1170 kg/m³ (83.2). The emulsifier contains (vol %): fatty acid aminoamides (43.5), amine oxide (0.85), and diesel fuel (55.65). The colloidal solution of hydrophobic silicon dioxide nanoparticles with particle size of 5 to 100 nm contains (vol %): silicon dioxide (31.8), propylene glycol monomethyl ether (68.15), and water (0.05).

The packer was seated (20 m above the upper perforations).

The remaining ESN volume was injected for further displacement into the interval being treated.

2) ESN in the FS string and the sub-packer area was displaced with an acid composition in a volume of 1.2 m³/m. An acid composition with the following composition was used (vol %): 30% hydrochloric acid (64.5), acetic acid (3.5), diethylene glycol (9), amide-based water repellent (1.8), Sinol IK-001 corrosion inhibitor (TU 20.59.59-130-56856807-2018) (2), and process water (19.2).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of calcium chloride with a density of 1160 kg/m$^3$ up to the FS open end.

4) The FS valve was closed. No holding time was provided.

Wind-up operations were carried out in accordance with the workover plan.

Third Stage.

After 12 months, a decrease in the daily oil flow rate of the well by over 25% was observed with a decrease in the productivity factor of over 25% over a period of 6 months.

Technological Operations:

1) ESN was injected in a volume of 2 m$^3$/m and the packer was seated in the following sequence:

ESN was injected up to a level of 23 m above the upper perforations of the interval being treated (on average, half of the estimated ESN volume). ESN contains (vol %): treated oil from the oil preparation and pumping station (16), emulsifier (3), colloidal solution of hydrophobic silicon dioxide nanoparticles with particle size of 5 to 100 nm (1), and an aqueous solution of calcium chloride with a density of 1173 kg/m$^3$ (80). The emulsifier contains (vol %): fatty acid aminoamides (45), amine oxide (1), and diesel fuel (54). The colloidal solution of hydrophobic silicon dioxide nanoparticles with particle size of 5 to 100 nm contains (vol %): silicon dioxide (32.5), propylene glycol monomethyl ether (67), and water (0.5).

The packer was seated (21 m above the upper perforations).

The remaining ESN volume was injected for further displacement into the interval being treated.

2) ESN in the FS string and the sub-packer area was displaced with a surfactant composition in a volume of 1.5 m$^3$/m. A surfactant composition of the following composition (vol %) was used: monoalkyl phenyl ethers of polyethylene glycol (40), sodium alkyliminodipropionates (2.5), polyglycols (15), and methanol (42.5).

During displacement, the surfactant composition was injected to the level of the FS open end. The pressure during displacement of the last portion of ESN into the formation was set at a level not exceeding safe pressure on the casing string.

3) The liquids in the FS (ESN+surfactant composition) were displaced with an aqueous solution of calcium chloride with a density of 1150 kg/m$^3$ up to the FS open end.

4) The FS valve was closed and the well was left for 1 hour in order for the surfactant composition to react with the rock.

Wind-up operations were carried out in accordance with the workover plan.

As a result of the treatments, an increase in the daily oil flow rate of the well was achieved in the range of 83-110%.

Example 6

Treatment of BRF consisting of terrigenous rock with formation temperature of 69° C.

First Stage.

Technological Operations for the Implementation of the Method:

1) ESN was injected in a volume of 2.3 m$^3$/m and the packer was seated in the following sequence:

ESN was injected up to a level of 25 m above the upper perforations of the interval being treated (on average, half of the estimated ESN volume). ESN contains (vol %): diesel fuel (18), emulsifier (3), colloidal solution of hydrophilic silicon dioxide nanoparticles with particle size of 5 to 100 nm (0.5), and an aqueous solution of potassium chloride with a density of 1205 kg/m$^3$ (78.5). The emulsifier contains (vol %): fatty acid aminoamides (45), amine oxide (0.9), and diesel fuel (54.1). The colloidal solution of hydrophilic silicon dioxide nanoparticles with particle size of 5 to 100 nm contains (vol %): silicon dioxide (30) in isopropanol (67) and in methanol (3).

The packer was seated (22 m above the upper perforations).

The remaining ESN volume was injected for further displacement into the interval being treated.

2) ESN in the FS string and the sub-packer area was displaced with an acid composition in a volume of 1.6 m$^3$/m. An acid composition with the following composition was used (vol %): 30% hydrochloric acid (60.5), hydrofluoric acid (3), acetic acid (3.3), diethylene glycol (8), amide-based water repellent (1.7), Sinol-IKK corrosion inhibitor (TU 2482-002-48482528-98) (1.9), and process water (21.6).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of potassium chloride with a density of 1195 kg/m$^3$ up to the FS open end.

4) The FS valve was closed. No holding was provided.

Wind-up operations were carried out in accordance with the workover plan.

Second Stage.

After 11 months, a decrease in the oil flow rate of the well by over 25% was observed with a decrease in the productivity factor of under 25% over a period of 6 months.

Technological Operations:

1) ESN was injected in a volume of 2.5 m$^3$/m and the packer was seated in the following sequence:

ESN was injected up to a level of 22 m above the upper perforations of the interval being treated (on average, half of the estimated ESN volume). ESN contains (vol %): treated oil from the oil preparation and pumping station (15), emulsifier (3), colloidal solution of hydrophilic silicon dioxide nanoparticles with particle size of 5 to 100 nm (1), and an aqueous solution of potassium chloride with a density of 1205 kg/m$^3$ (81). The emulsifier contains (vol %): fatty acid aminoamides (43.5), amine oxide (0.95), and diesel fuel (55.55). The colloidal solution of hydrophilic silicon dioxide nanoparticles with particle size of 5 to 100 nm contains (vol %): silicon dioxide (31) in isopropanol (68.5) and in methanol (0.5).

The packer was seated (20 m above the upper perforations).

The remaining ESN volume was injected for further displacement into the interval being treated.

3) ESN in the FS string and the sub-packer area was displaced with an acid composition in a volume of 1.8 m³/m. An acid composition with the following composition was used (vol %): 30% hydrochloric acid (60.8), hydrofluoric acid (3), acetic acid (3.5), diethylene glycol (8.7), amide-based water repellent (1.5), Sinol-IKK corrosion inhibitor (TU 2482-002-48482528-98) (2), and process water (21.5).

During displacement, the acid composition was injected to the level of the FS open end. The pressure during displacement of the last portion of ESN into the formation was set at a level not exceeding safe pressure on the casing string.

4) The liquids in the FS (ESN+acid composition) were displaced with an aqueous solution of calcium chloride with a density of 1192 kg/m³ up to the FS open end.

5) The FS valve was closed. No holding time was provided.

Wind-up operations were carried out in accordance with the workover plan.

Third Stage.

After 11 months, a decrease in the oil flow rate of the well by over 25% was observed with a decrease in the productivity factor of over 25%) over a period of 6 months.

Technological Operations:

1) ESN was injected in a volume of 2.3 m3/m and the packer was seated in the following sequence:
ESN was injected up to a level of 25 m above the upper perforations of the interval being treated (on average, half of the estimated ESN volume). ESN contains (vol %): treated oil from the oil preparation and pumping station (20), emulsifier (3), colloidal solution of hydrophilic silicon dioxide nanoparticles with particle size of 5 to 100 nm (0.8), and an aqueous solution of potassium chloride with a density of 1205 kg/m³ (76.2). The emulsifier contains (vol %): fatty acid aminoamides (43), amine oxide (1), and diesel fuel (56). The colloidal solution of hydrophilic silicon dioxide nanoparticles with particle size of 5 to 100 nm contains (vol %): silicon dioxide (30.6) in isopropanol (67.5) and in methanol (1.9).
The packer was seated (23 m above the upper perforations).
The remaining ESN volume was injected for further displacement into the interval being treated.

2) ESN in the FS string and the sub-packer area was displaced with a surfactant composition in a volume of 2 m³/m. A surfactant composition of the following composition (vol %) was used: monoalkyl phenyl ethers of polyethylene glycol (40.6), sodium alkyliminodipropionates (2.8), polyglycols (15.7), and methanol (40.9).

During displacement, the surfactant composition was injected to the level of the FS open end. The pressure during displacement of the last portion of ESN into the formation was set at a level not exceeding safe pressure on the casing string.

3) The liquids in the FS (ESN+surfactant composition) were displaced with an aqueous solution of potassium chloride with a density of 1190 kg/m³ up to the FS open end.

4) The FS valve was closed and the well was left for 1.5 hours in order for the surfactant composition to react with the rock.

Wind-up operations were carried out in accordance with the workover plan.

As a result of the treatments, an increase in the daily oil flow rate of the well was achieved in the range of 157-184%.

Example 7

Treatment of BRF consisting of carbonate rock with formation temperature of 98° C.

First Stage.

Technological Operations for the Implementation of the Method:

1) ESN was injected in a volume of 2 m³/m and the packer was seated in the following sequence:
ESN was injected up to a level of 24 m above the upper perforations of the interval being treated (on average, half of the estimated ESN volume). ESN contains (vol %): treated oil from the oil preparation and pumping station (17), emulsifier (3), colloidal solution of hydrophobic silicon dioxide nanoparticles with particle size of 5 to 100 nm (1), and an aqueous solution of calcium chloride with a density of 1150 kg/m³ (79). The emulsifier contains (vol %): fatty acid aminoamides (43), amine oxide (0.7), high-temperature crosslinking filler (lime) (2) and diesel fuel (54.3). The colloidal solution of hydrophobic silicon dioxide nanoparticles with particle size of 5 to 100 nm contains (vol %): silicon dioxide (31), propylene glycol monomethyl ether (68.7), and water (0.3).
The packer was seated (23 m above the upper perforations).
The remaining ESN volume was injected for further displacement into the interval being treated.

2) ESN in the FS string and the sub-packer area was displaced with an acid composition in a volume of 1.2 m³/m. An acid composition with the following composition was used (vol %): 30% hydrochloric acid (63.5), acetic acid (3.5), diethylene glycol (8), amide-based water repellent (1.5), Sinol IK-001 corrosion inhibitor (TU 20.59.59-130-56856807-2018) (1.5), and process water (22).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of calcium chloride with a density of 1138 kg/m³ up to the FS open end.

4) The FS valve was closed. No holding time was provided.

Wind-up operations were carried out in accordance with the workover plan.

Second Stage.

After 10 months, a decrease in the oil flow rate of the well by over 25% was observed with a decrease in the productivity factor of under 25%) over a period of 6 months.

Technological Operations:

1) ESN was injected in a volume of 2.2 m³/m and the packer was seated in the following sequence:
ESN was injected up to a level of 22 m above the upper perforations of the interval being treated (on average, half of the estimated ESN volume). ESN contains (vol %): treated oil from the oil preparation and pumping station (15), emulsifier (3), colloidal solution of hydrophobic silicon dioxide nanoparticles with particle size of 5 to 100 nm (1), and an aqueous solution of calcium chloride with a density of 1160 kg/m³ (81). The emulsifier contains (vol %): fatty acid aminoamides (43.5), amine oxide (0.85), high-temperature crosslinking filler (lime) (3) and diesel fuel (52.65). The colloidal solution of hydrophobic silicon dioxide nanoparticles with particle size of 5 to 100 nm contains (vol %): silicon dioxide (31.8), propylene glycol monomethyl ether (68), and water (0.2).

The packer was seated (20 m above the upper perforations).

The remaining ESN volume was injected for further displacement into the interval being treated.

2) ESN in the FS string and the sub-packer area was displaced with an acid composition in a volume of 1.2 m$^3$/m. An acid composition with the following composition was used (vol %): 30% hydrochloric acid (64.5), acetic acid (3.5), diethylene glycol (9), amide-based water repellent (1.8), Sinol IK-001 corrosion inhibitor (TU 20.59.59-130-56856807-2018) (2), and process water (19.2).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of calcium chloride with a density of 1145 kg/m$^3$ up to the FS open end.

4) The FS valve was closed. No holding time was provided.

Wind-up operations were carried out in accordance with the workover plan.

Third Stage.

After 9 months, a decrease in the oil flow rate of the well by over 25% was observed with a decrease in the productivity factor of over 25% over a period of 6 months.

Technological Operations:

1) ESN was injected in a volume of 2.2 m3/m and the packer was seated in following sequence:

ESN was injected up to a level of 23 m above the upper perforations of the interval being treated (on average, half of the estimated ESN volume). ESN contains (vol %): treated oil from the oil preparation and pumping station (16), emulsifier (3), colloidal solution of hydrophobic silicon dioxide nanoparticles with particle size of 5 to 100 nm (0.5), and an aqueous solution of calcium chloride with a density of 1160 kg/m$^3$ (80.5). The emulsifier contains (vol %): fatty acid aminoamides (44.5), amine oxide (0.8), high-temperature cross-linking filler (lime) (4.5) and diesel fuel (50.2). The colloidal solution of hydrophobic silicon dioxide nanoparticles with particle size of 5 to 100 nm contains (vol %): silicon dioxide (32.5), propylene glycol monomethyl ether (67), and water (0.5).

The packer was seated (21 m above the upper perforations).

The remaining ESN volume was injected for further displacement into the interval being treated.

2) ESN in the FS string and the sub-packer area was displaced with a surfactant composition in a volume of 1.5 m$^3$/m. A surfactant composition of the following composition (vol %) was used: monoalkyl phenyl ethers of polyethylene glycol (40), sodium alkyliminodipropionates (2.5), polyglycols (15), and methanol (42.5).

During displacement, the surfactant composition was injected to the level of the FS open end. The pressure during displacement of the last portion of ESN into the formation was set at a level not exceeding safe pressure on the casing string.

3) The liquids in the FS (ESN+surfactant composition) were displaced with an aqueous solution of calcium chloride with a density of 1150 kg/m$^3$ up to the FS open end.

4) The FS valve was closed and the well was left for 1 hour in order for the surfactant composition to react with the rock.

Wind-up operations were carried out in accordance with the workover plan.

As a result of the treatments, an increase in the daily oil flow rate of the well was achieved in the range of 195-202%.

Example 8

Treatment of BRF consisting of terrigenous rock with formation temperature of 125° C.

First Stage.

Technological Operations for the Implementation of the Method:

1) ESN was injected in a volume of 3.2 m$^3$/m and the packer was seated in the following sequence:

ESN was injected up to a level of 25 m above the upper perforations of the interval being treated (on average, half of the estimated ESN volume). ESN contains (vol %): diesel fuel (10), emulsifier (3), colloidal solution of hydrophilic silicon dioxide nanoparticles with particle size of 5 to 100 nm (0.5), and an aqueous solution of potassium chloride with a density of 1200 kg/m$^3$ (86.5). The emulsifier contains (vol %): fatty acid aminoamides (45), amine oxide (0.9), high-temperature cross-linking filler (bentonite) (5) and diesel fuel (49.1). The colloidal solution of hydrophilic silicon dioxide nanoparticles with particle size of 5 to 100 nm contains (vol %): silicon dioxide (30) in isopropanol (67) and in methanol (3).

The packer was seated (22 m above the upper perforations).

The remaining ESN volume was injected for further displacement into the interval being treated.

2) ESN in the FS string and the sub-packer area was displaced with an acid composition in a volume of 1.3 m$^3$/m. An acid composition with the following composition was used (vol %): 30% hydrochloric acid (60.5), hydrofluoric acid (3), acetic acid (3.3), diethylene glycol (8), amide-based water repellent (1.7), Sinol-IKK corrosion inhibitor (TU 2482-002-48482528-98) (1.9), and process water (21.6).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of potassium chloride with a density of 1192 kg/m$^3$ up to the FS open end.

4) The FS valve was closed. No holding was provided.

Wind-up operations were carried out in accordance with the workover plan.

Second Stage.

After 13 months, a decrease in the oil flow rate of the well by over 25% was observed with a decrease in the productivity factor of under 25% over a period of 6 months.

Technological Operations:

1) ESN was injected in a volume of 3.2 m$^3$/m and the packer was seated in the following sequence:

ESN was injected up to a level of 22 m above the upper perforations of the interval being treated (on average, half of the estimated ESN volume). ESN contains (vol %): diesel fuel (13), emulsifier (3), colloidal solution of hydrophilic silicon dioxide nanoparticles with particle size of 5 to 100 nm (0.8), and an aqueous solution of potassium chloride with a density of 1210 kg/m$^3$ (83.2).

The emulsifier contains (vol %): fatty acid aminoamides (43.5), amine oxide (0.95), high-temperature crosslinking filler (bentonite) (4.5) and diesel fuel (51.05). The colloidal solution of hydrophilic silicon dioxide nanoparticles with particle size of 5 to 100 nm contains (vol %): silicon dioxide (31) in isopropanol (68.5) and in methanol (0.5).

The packer was seated (20 m above the upper perforations).

The remaining ESN volume was injected for further displacement into the interval being treated.

2) ESN in the FS string and the sub-packer area was displaced with an acid composition in a volume of 1.4 m$^3$/m. An acid composition with the following composition was used (vol %): 30% hydrochloric acid (60.8), hydrofluoric acid (3), acetic acid (3.5), diethylene glycol (8.7), amide-based water repellent (1.5), Sinol-IKK corrosion inhibitor (TU 2482-002-48482528-98) (2), and process water (21.5).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of calcium chloride with a density of 1196 kg/m$^3$ up to the FS open end.

4) The FS valve was closed. No holding time was provided.

Wind-up operations were carried out in accordance with the workover plan.

Third Stage.

After 11 months, a decrease in the oil flow rate of the well by over 25% was observed with a decrease in the productivity factor of over 25%) over a period of 6 months.

Technological Operations:

1) ESN was injected in a volume of 2.3 m$^3$/m and the packer was seated in the following sequence:

ESN was injected up to a level of 25 m above the upper perforations of the interval being treated (on average, half of the estimated ESN volume). ESN contains (vol %): treated oil from the oil preparation and pumping station (18), emulsifier (3), colloidal solution of hydrophilic silicon dioxide nanoparticles with particle size of 5 to 100 nm (1), and an aqueous solution of potassium chloride with a density of 1205 kg/m$^3$ (78). The emulsifier contains (vol %): fatty acid aminoamides (43), amine oxide (1), high-temperature crosslinking filler (bentonite) (4) and diesel fuel (52). The colloidal solution of hydrophilic silicon dioxide nanoparticles with particle size of 5 to 100 nm contains (vol %): silicon dioxide (30.6) in isopropanol (67.5) and in methanol (1.9).

The packer was seated (23 m above the upper perforations).

The remaining ESN volume was injected for further displacement into the interval being treated.

2) ESN in the FS string and the sub-packer area was displaced with a surfactant composition in a volume of 2 m$^3$/m. A surfactant composition of the following composition (vol %) was used: monoalkyl phenyl ethers of polyethylene glycol (40.6), sodium alkyliminodipropionates (2.8), polyglycols (15.7), and methanol (40.9).

During displacement, the surfactant composition was injected to the level of the FS open end. The pressure during displacement of the last portion of ESN into the formation was set at a level not exceeding safe pressure on the casing string.

3) The liquids in the FS (ESN+surfactant composition) were displaced with an aqueous solution of potassium chloride with a density of 1192 kg/m$^3$ up to the FS open end.

4) The FS valve was closed and the well was left for 1 hour in order for the surfactant composition to react with the rock.

Wind-up operations were carried out in accordance with the workover plan.

As a result of the treatments, an increase in the daily oil flow rate of the well was achieved in the range of 128-140%.

Example 9

Treatment of BRF consisting of carbonate rock with formation temperature of 135° C.

First Stage.

Technological Operations for the Implementation of the Method:

1) ESN was injected in a volume of 2.8 m$^3$/m and the packer was seated in the following sequence:

ESN was injected up to a level of 25 m above the upper perforations of the interval being treated (on average, half of the estimated ESN volume). ESN contains (vol %): diesel fuel (14), emulsifier (3), colloidal solution of hydrophobic silicon dioxide nanoparticles with particle size of 5 to 100 nm (1), and an aqueous solution of calcium chloride with a density of 1195 kg/m$^3$ (82). The emulsifier contains (vol %): fatty acid aminoamides (45), amine oxide (1), high-temperature crosslinking filler (bentonite) (5) and diesel fuel (49). The colloidal solution of hydrophobic silicon dioxide nanoparticles with particle size of 5 to 100 nm contains (vol %): silicon dioxide (32.2), propylene glycol monomethyl ether (67.5), and water (0.3).

The packer was seated (23 m above the upper perforations).

The remaining ESN volume was injected for further displacement into the interval being treated.

2) ESN in the FS string and the sub-packer area was displaced with an acid composition in a volume of 1.5 m$^3$/m. An acid composition with the following composition was used (vol %): 30% hydrochloric acid (63.5), acetic acid (3.5), diethylene glycol (9), amide-based water repellent (2), Sinol IK-001 corrosion inhibitor (TU 20.59.59-130-56856807-2018) (2), and process water (20).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of calcium chloride with a density of 1183 kg/m$^3$ up to the FS open end.

4) The FS valve was closed. No holding was provided.

Wind-up operations were carried out in accordance with the workover plan.

Second Stage.

After 12 months, a decrease in the oil flow rate of the well by over 25% was observed with a decrease in the productivity factor of over 25% over a period of 4 months.

Technological Operations:

1) ESN was injected in a volume of 2.5 m$^3$/m and the packer was seated in the following sequence:

ESN was injected up to a level of 25 m above the upper perforations of the interval being treated (on average, half of the estimated ESN volume). ESN contains (vol %): treated oil from the oil preparation and pumping station (12), emulsifier (3), colloidal solution of hydrophobic silicon dioxide nanoparticles with particle size of 5 to 100 nm (0.5), and an aqueous solution of calcium chloride with a density of 1190 kg/m$^3$ (84.5). The emulsifier contains (vol %): fatty acid aminoamides (43), amine oxide (0.9), high-temperature crosslinking filler (bentonite) (3) and diesel fuel (53.1). The colloidal solution of hydrophobic silicon dioxide nanoparticles with particle size of 5 to 100 nm contains (vol %): silicon dioxide (31), propylene glycol monomethyl ether (68.6), and water (0.4).

The packer was seated (23 m above the upper perforations).

The remaining ESN volume was injected for further displacement into the interval being treated.

2) ESN in the FS string and the sub-packer area was displaced with an acid composition in a volume of 1.7 m$^3$/m. An acid composition with the following composition was used (vol %): 30% hydrochloric acid (63.5), acetic acid (3.5), diethylene glycol (8.5), amide-based water repellent (1.7), Sinol IK-001 corrosion inhibitor (TU 20.59.59-130-56856807-2018) (2), and process water (20.8).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of calcium chloride with a density of 1180 kg/m$^3$ up to the FS open end.

4) The FS valve was closed. No holding was provided.

Wind-up operations were carried out in accordance with the workover plan.

Third Stage.

After 8 months, a decrease in the oil flow rate of the well by over 25% was observed with a decrease in the productivity factor of under 25% over a period of 6 months.

Technological Operations:

1) ESN was injected in a volume of 2.9 m$^3$/m and the packer was seated in the following sequence:

ESN was injected up to a level of 25 m above the upper perforations of the interval being treated (on average, half of the estimated ESN volume). ESN contains (vol %): treated oil from the oil preparation and pumping station (10), emulsifier (3), colloidal solution of hydrophobic silicon dioxide nanoparticles with particle size of 5 to 100 nm (1), and an aqueous solution of calcium chloride with a density of 1190 kg/m$^3$ (86). The emulsifier contains (vol %): fatty acid aminoamides (44), amine oxide (0.9), high-temperature crosslinking filler (bentonite) (4) and diesel fuel (51.1). The colloidal solution of hydrophobic silicon dioxide nanoparticles with particle size of 5 to 100 nm contains (vol %): silicon dioxide (31.2), propylene glycol monomethyl ether (68.6), and water (0.2).

The packer was seated (23 m above the upper perforations).

The remaining ESN volume was injected for further displacement into the interval being treated.

2) ESN in the FS string and the sub-packer area was displaced with a surfactant composition in a volume of 2.7 m$^3$/m. A surfactant composition of the following composition (vol %) was used: monoalkyl phenyl ethers of polyethylene glycol (41), sodium alkyliminodipropionates (3), poly glycols (16), and methanol (40).

During displacement, the surfactant composition was injected to the level of the FS open end. The pressure during displacement of the last portion of ESN into the formation was set at a level not exceeding safe pressure on the casing string.

3) The liquids in the FS (ESN+surfactant composition) were displaced with an aqueous solution of calcium chloride with a density of 1183 kg/m$^3$ up to the FS open end.

4) The FS valve was closed and the well was left for 0.5 hours in order for the surfactant composition to react with the rock.

Wind-up operations were carried out in accordance with the workover plan.

As a result of the treatments, an increase in the daily oil flow rate of the well was achieved in the range of 82-97%.

Example 10

Treatment of BRF consisting of terrigenous rock with formation temperature of 105° C.

First Stage.

Technological Operations for the Implementation of the Method:

1) ESN was injected in a volume of 2 m$^3$/m and the packer was seated in the following sequence:

ESN was injected up to a level of 22 m above the upper perforations of the interval being treated (on average, half of the estimated ESN volume). ESN contains (vol %): treated oil from the oil preparation and pumping station (20), emulsifier (3), colloidal solution of hydrophilic silicon dioxide nanoparticles with particle size of 5 to 100 nm (0.5), and an aqueous solution of potassium chloride with a density of 1210 kg/m$^3$ (76.5). The emulsifier contains (vol %): fatty acid aminoamides (43), amine oxide (1), high-temperature crosslinking filler (lime) (2) and diesel fuel (54). The colloidal solution of hydrophilic silicon dioxide nanoparticles with particle size of 5 to 100 nm contains (vol %): silicon dioxide (29) in ethylene glycol (71).

The packer was seated (20 m above the upper perforations).

The remaining ESN volume was injected for further displacement into the interval being treated.

2) ESN in the FS string and the sub-packer area was displaced with an acid composition in a volume of 1.4 m$^3$/m. An acid composition with the following composition was used (vol %): 30% hydrochloric acid (61), hydrofluoric acid (3.5), acetic acid (3.5), diethylene glycol (9), amide-based water repellent (2), Sinol-IKK corrosion inhibitor (TU 2482-002-48482528-98) (2), and process water (19).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of potassium chloride with a density of 1198 kg/m$^3$ up to the FS open end.

4) The FS valve was closed. No holding time was provided.

Wind-up operations were carried out in accordance with the workover plan.

Second Stage.

After 12 months, a decrease in the oil flow rate of the well by over 25% was observed with a decrease in the productivity factor of under 25% over a period of 6 months.

Technological Operations:

1) ESN was injected in a volume of 2.2 m³ per meter of perforated capacity of the interval being treated (m³/m) and the packer was seated in the following sequence:

ESN was injected up to a level of 23 m above the upper perforations of the interval being treated (on average, half of the estimated ESN volume). ESN contains (vol %): diesel fuel (17), emulsifier (3), colloidal solution of hydrophilic silicon dioxide nanoparticles with particle size of 5 to 100 nm (1), and an aqueous solution of potassium chloride with a density of 1210 kg/m³ (79). The emulsifier contains (vol %): fatty acid aminoamides (44), amine oxide (0.85), high-temperature crosslinking filler (lime) (3.5) and diesel fuel (51.65). The colloidal solution of hydrophilic silicon dioxide nanoparticles with particle size of 5 to 100 nm contains (vol %): silicon dioxide (30) in ethylene glycol (70).

The packer was seated (21 m above the upper perforations).

The remaining ESN volume was injected for further displacement into the interval being treated.

2) ESN in the FS string and the sub-packer area was displaced with an acid composition in a volume of 1.6 m³/m. An acid composition with the following composition was used (vol %): 30% hydrochloric acid (60.7), hydrofluoric acid (3), acetic acid (3.5), diethylene glycol (9), amide-based water repellent (2), Sinol-IKK corrosion inhibitor (TU 2482-002-48482528-98) (2), and process water (19.8).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of potassium chloride with a density of 1196 kg/m³ up to the FS open end.

4) The FS valve was closed. No holding time was provided.

Wind-up operations were carried out in accordance with the workover plan.

Third Stage.

After 13 months, a decrease in the oil flow rate of the well by over 25% was observed with a decrease in the productivity factor of over 25% over a period of 6 months.

Technological Operations:

1) ESN was injected in a volume of 2.4 m³ per meter of perforated capacity of the interval being treated (m³/m) and the packer was seated in the following sequence:

ESN was injected up to a level of 25 m above the upper perforations of the interval being treated (on average, half of the estimated ESN volume). ESN contains (vol %): diesel fuel (20), emulsifier (3), colloidal solution of hydrophilic silicon dioxide nanoparticles with particle size of 5 to 100 nm (0.8), and an aqueous solution of potassium chloride with a density of 1205 kg/m³ (76.2). The emulsifier contains (vol %): fatty acid aminoamides (45), amine oxide (0.9), high-temperature crosslinking filler (lime) (5) and diesel fuel (49.1). The colloidal solution of hydrophilic silicon dioxide nanoparticles with particle size of 5 to 100 nm contains (vol %): silicon dioxide (31) in ethylene glycol (69).

The packer was seated (24 m above the upper perforations).

The remaining ESN volume was injected for further displacement into the interval being treated.

2) ESN in the FS string and the sub-packer area was displaced with a surfactant composition in a volume of 1.7 m³/m. A surfactant composition of the following composition (vol %) was used: monoalkyl phenyl ethers of polyethylene glycol (40.6), sodium alkyliminodipropionates (2.8), polyglycols (15.7), and methanol (40.9).

During displacement, the surfactant composition was injected to the level of the FS open end. The pressure during displacement of the last portion of ESN into the formation was set at a level not exceeding safe pressure on the casing string.

3) The liquids in the FS (ESN+surfactant composition) were displaced with an aqueous solution of potassium chloride with a density of 1190 kg/m³ up to the FS open end.

4) The FS valve was closed and the well was left for 1 hour in order for the surfactant composition to react with the rock.

Wind-up operations were carried out in accordance with the workover plan.

As a result of the treatments, an increase in the daily oil flow rate of the well was achieved in the range of 64-90%.

Example 11

Treatment of BRF consisting of terrigenous rock with formation temperature of 90° C.

First Stage.

Technological Operations for the Implementation of the Method:

1) ESN was injected in a volume of 2.8 m³/m and the packer was seated in the following sequence:

ESN was injected up to a level of 25 m above the upper perforations of the interval being treated (on average, half of the estimated ESN volume). ESN contains (vol %): treated oil from the oil preparation and pumping station (11), emulsifier (3), hydrophilic nanoparticles of dry amorphous silicon dioxide with particle size of 5 to 500 nm (1), and an aqueous solution of potassium chloride with a density of 1180 kg/m³ (85). The emulsifier contains (vol %): fatty acid aminoamides (43), amine oxide (0.7), high-temperature crosslinking filler (lime) (2) and diesel fuel (54.3).

The packer was seated (23 m above the upper perforations).

The remaining ESN volume was injected for further displacement into the interval being treated.

2) ESN in the FS string and the sub-packer area was displaced with an acid composition in a volume of 1.4 m³/m. An acid composition with the following composition was used (vol %): 30% hydrochloric acid (60.5), hydrofluoric acid (3), acetic acid (3.3), diethylene glycol (8), amide-based water repellent (1.7), Sinol-IKK corrosion inhibitor (TU 2482-002-48482528-98) (1.9), and process water (21.6).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of potassium chloride with a density of 1172 kg/m³ up to the FS open end.

4) The FS valve was closed. No holding was provided.

Wind-up operations were carried out in accordance with the workover plan.

Second Stage.

After 12 months, a decrease in the oil flow rate of the well by over 25% was observed with a decrease in the productivity factor of under 25% over a period of 6 months.

Technological Operations:

1) ESN was injected in a volume of 3 m³/m and the packer was seated in the following sequence:

ESN was injected up to a level of 22 m above the upper perforations of the interval being treated (on average, half of the estimated ESN volume). ESN contains (vol %): diesel fuel (10), emulsifier (3), hydrophilic nanoparticles of dry amorphous silicon dioxide with particle size of 5 to 500 nm (1.5), and an aqueous solution of calcium chloride with a density of 1182 kg/m³ (85.5). The emulsifier contains (vol %): fatty acid aminoamides (45), amine oxide (0.75), high-temperature crosslinking filler (lime) (5) and diesel fuel (49.25).

The packer was seated (20 m above the upper perforations).

The remaining ESN volume was injected for further displacement into the interval being treated.

2) ESN in the FS string and the sub-packer area was displaced with an acid composition in a volume of 1.8 m³/m. An acid composition with the following composition was used (vol %): 30% hydrochloric acid (60.8), hydrofluoric acid (3), acetic acid (3.5), diethylene glycol (8.7), amide-based water repellent (1.5), Sinol-IKK corrosion inhibitor (TU 2482-002-48482528-98) (2), and process water (21.5).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of calcium chloride with a density of 1175 kg/m³ up to the FS open end.

4) The FS valve was closed. No holding time was provided.

Wind-up operations were carried out in accordance with the workover plan.

Third Stage.

After 8 months, a decrease in the oil flow rate of the well by over 25% was observed with a decrease in the productivity factor of under 25% over a period of 6 months.

Technological Operations:

1) ESN was injected in a volume of 3.2 m³/m and the packer was seated in the following sequence:

ESN was injected up to a level of 25 m above the upper perforations of the interval being treated (on average, half of the estimated ESN volume). ESN contains (vol %): treated oil from the oil preparation and pumping station (10), emulsifier (3), hydrophilic nanoparticles of dry amorphous silicon dioxide with particle size of 5 to 500 nm (2), and an aqueous solution of potassium chloride with a density of 1183 kg/m³ (85). The emulsifier contains (vol %): fatty acid aminoamides (43), amine oxide (0.7), high-temperature crosslinking filler (lime) (5) and diesel fuel (51.3).

The packer was seated (23 m above the upper perforations).

The remaining ESN volume was injected for further displacement into the interval being treated.

2) ESN in the FS string and the sub-packer area was displaced with a surfactant composition in a volume of 2 m³/m. A surfactant composition of the following composition (vol %) was used: monoalkyl phenyl ethers of polyethylene glycol (40.6), sodium alkyliminodipropionates (2.8), polyglycols (15.7), and methanol (40.9).

During displacement, the surfactant composition was injected to the level of the FS open end. The pressure during displacement of the last portion of ESN into the formation was set at a level not exceeding safe pressure on the casing string.

3) The liquids in the FS (ESN+surfactant composition) were displaced with an aqueous solution of potassium chloride with a density of 1175 kg/m³ up to the FS open end.

4) The FS valve was closed and the well was left for 1.5 hours in order for the surfactant composition to react with the rock.

Wind-up operations were carried out in accordance with the workover plan. As a result of the treatments, an increase in the daily oil flow rate of the well was achieved in the range of 190-205%.

Example 12

Treatment of BRF consisting of carbonate rock with formation temperature of 98° C.

First Stage.

Technological Operations for the Implementation of the Method:

1) ESN was injected in a volume of 2.3 m3/m and the packer was seated in following sequence:

ESN was injected up to a level of 24 m above the upper perforations of the interval being treated (on average, half of the estimated ESN volume). ESN contains (vol %): treated oil from the oil preparation and pumping station (13), emulsifier (3), colloidal solution of hydrophobic silicon dioxide nanoparticles with particle size of 5 to 100 nm (0.5), and an aqueous solution of calcium chloride with a density of 1150 kg/m³ (83.5). The emulsifier contains (vol %): fatty acid aminoamides (43), amine oxide (0.7), high-temperature crosslinking filler (lime) (2) and diesel fuel (54.3). The colloidal solution of hydrophobic silicon dioxide nanoparticles with particle size of 5 to 100 nm contains (vol %): silicon dioxide (31), propylene glycol monomethyl ether (68.7), and water (0.3).

The packer was seated (23 m above the upper perforations).

The remaining ESN volume was injected for further displacement into the interval being treated.

2) ESN in the FS string and the sub-packer area was displaced with an acid composition in a volume of 1.4 m³/m. An acid composition with the following composition was used (vol %): 30% hydrochloric acid (63.5), acetic acid (3.5), diethylene glycol (8), amide-based water repellent (1.5), Sinol IK-001 corrosion inhibitor (TU 20.59.59-130-56856807-2018) (1.5), and process water (22).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of calcium chloride with a density of 1143 kg/m³ up to the FS open end.

4) The FS valve was closed. No holding time was provided.

Wind-up operations were carried out in accordance with the workover plan.

Second Stage.

After 10 months, a decrease in the oil flow rate of the well by over 25% was observed with a decrease in the productivity factor of under 25% over a period of 6 months.

All technological steps for the implementation of the method were carried out in the order indicated in first stage of Example 12. For Example 12, only differences in volumes and types of injected process liquids will be stated hereinafter.

Technological Operations:

1) ESN was injected in a volume of 2.6 m³/m and the packer was seated in the following sequence:

ESN was injected up to a level of 22 m above the upper perforations of the interval being treated (on average, half of the estimated ESN volume). ESN contains (vol %): treated oil from the oil preparation and pumping station (11), emulsifier (3), colloidal solution of hydrophobic silicon dioxide nanoparticles with particle size of 5 to 100 nm (1), and an aqueous solution of calcium chloride with a density of 1155 kg/m³ (85). The emulsifier contains (vol %): fatty acid aminoamides (43.5), amine oxide (0.85), high-temperature crosslinking filler (lime) (3) and diesel fuel (52.65). The colloidal solution of hydrophobic silicon dioxide nanoparticles with particle size of 5 to 100 nm contains (vol %): silicon dioxide (31.8), propylene glycol monomethyl ether (68), and water (0.2).

The packer was seated (20 m above the upper perforations).

The remaining ESN volume was injected for further displacement into the interval being treated.

2) ESN in the FS string and the sub-packer area was displaced with an acid composition in a volume of 1.5 m³/m. An acid composition with the following composition was used (vol %): 30% hydrochloric acid (64.5), acetic acid (3.5), diethylene glycol (9), amide-based water repellent (1.8), Sinol IK-001 corrosion inhibitor (TU 20.59.59-130-56856807-2018) (2), and process water (19.2).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of calcium chloride with a density of 1146 kg/m³ up to the FS open end.

4) The FS valve was closed. No holding time was provided.

Wind-up operations were carried out in accordance with the workover plan.

Third Stage.

After 9 months, a decrease in the oil flow rate of the well by over 25% was observed with a decrease in the productivity factor of under 25% over a period of 6 months.

Technological Operations:

1) ESN was injected in a volume of 2.5 m³/m and the packer was seated in the following sequence:

ESN was injected up to a level of 23 m above the upper perforations of the interval being treated (on average, half of the estimated ESN volume). ESN contains (vol %): treated oil from the oil preparation and pumping station (10), emulsifier (3), colloidal solution of hydrophobic silicon dioxide nanoparticles with particle size of 5 to 100 nm (0.5), and an aqueous solution of calcium chloride with a density of 1155 kg/m³ (86.5). The emulsifier contains (vol %): fatty acid aminoamides (44.5), amine oxide (0.8), high-temperature crosslinking filler (lime) (4.5) and diesel fuel (50.2). The colloidal solution of hydrophobic silicon dioxide nanoparticles with particle size of 5 to 100 nm contains (vol %): silicon dioxide (32.5), propylene glycol monomethyl ether (67), and water (0.5).

The packer was seated (21 m above the upper perforations).

The remaining ESN volume was injected for further displacement into the interval being treated.

2) ESN in the FS string and the sub-packer area was displaced with a surfactant composition in a volume of 2 m³/m. A surfactant composition of the following composition (vol %) was used: monoalkyl phenyl ethers of polyethylene glycol (40), sodium alkyliminodipropionates (2.5), polyglycols (15), and methanol (42.5).

During displacement, the surfactant composition was injected to the level of the FS open end. The pressure during displacement of the last portion of ESN into the formation was set at a level not exceeding safe pressure on the casing string.

3) The liquids in the FS (ESN+surfactant composition) were displaced with an aqueous solution of calcium chloride with a density of 1148 kg/m³ up to the FS open end.

4) The FS valve was closed and the well was left for 1 hour in order for the surfactant composition to react with the rock.

Wind-up operations were carried out in accordance with the workover plan.

As a result of the treatments, an increase in the daily oil flow rate of the well was achieved in the range of 85-94%.

Example 13

Treatment of BRF consisting of terrigenous rock with formation temperature of 105° C.

First Stage.

Before implementing the method, the well was prepared for treatment in order to ensure cleanliness of the bottom hole and the BRF. For this purpose, the following technological operations were carried out:

running the FS with a funnel to the artificial bottom hole;

flushing the well with a mineralized solution with a gradual admission of the FS to the perforated interval, and lower to the bottom hole with flushing fluid with increased sand-holding properties, the fluid not reducing BRF permeability due to the surfactant content.

An FS open end was mounted in the interval 2 m below the BRF interval being treated.

Following the completion of all preparatory operations in accordance with the well workover plan, technological operations were started to implement the method:

1) ESN was injected in a volume of 1.7 m³/m and the packer was seated in the following sequence:

ESN was injected up to a level of 22 m above the upper perforations of the interval being treated (on average, half of the estimated ESN volume). ESN contains (vol %): treated oil from the oil preparation and pumping station (19), emulsifier (3), colloidal solution of hydrophobic silicon dioxide nanoparticles with particle size of 5 to 100 nm (0.7), and an aqueous solution of calcium chloride with a density of 1180 kg/m³ (77.3). The emulsifier contains (vol %): fatty acid aminoamides (43), amine oxide (1), high-temperature crosslinking filler (lime) (2) and diesel fuel (54). The colloidal solution of hydrophobic silicon dioxide nanoparticles with particle size of 5 to 100 nm contains (vol %): silicon dioxide (32.5), propylene glycol monomethyl ether (67), and water (0.5).

The packer was seated (20 m above the upper perforations).

The remaining ESN volume was injected for further displacement into the interval being treated.

2) ESN in the FS string and the sub-packer area was displaced with an acid composition in a volume of 1.1 m³/m. An acid composition with the following composition was used (vol %): 30% hydrochloric acid (61), hydrofluoric acid (3.5), acetic acid (3.5), diethylene glycol (9), amide-based water repellent (2), Sinol-IKK corrosion inhibitor (TU 2482-002-48482528-98) (2), and process water (19).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of potassium chloride with a density of 1163 kg/m³ up to the FS open end.

4) The FS valve was closed. No holding time was provided.

Wind-up operations were carried out in accordance with the workover plan.

Second Stage.

After 12 months, a decrease in the oil flow rate of the well by over 25% was observed with a decrease in the productivity factor of under 25% over a period of 6 months.

Technological Operations:

1) ESN was injected in a volume of 2 m³/m and the packer was seated in the following sequence:

ESN was injected up to a level of 23 m above the upper perforations of the interval being treated (on average, half of the estimated ESN volume). ESN contains (vol %): diesel fuel (17), emulsifier (3), colloidal solution of hydrophobic silicon dioxide nanoparticles with particle size of 5 to 100 nm (1), and an aqueous solution of potassium chloride with a density of 1180 kg/m³ (79). The emulsifier contains (vol %): fatty acid aminoamides (44), amine oxide (0.85), high-temperature cross-linking filler (lime) (3.5) and diesel fuel (51.65). The colloidal solution of hydrophobic silicon dioxide nanoparticles with particle size of 5 to 100 nm contains (vol %): silicon dioxide (31.8), propylene glycol monomethyl ether (68), and water (0.2).

The packer was seated (21 m above the upper perforations).

The remaining ESN volume was injected for further displacement into the interval being treated.

2) ESN in the FS string and the sub-packer area was displaced with an acid composition in a volume of 1.3 m³/m. An acid composition with the following composition was used (vol %): 30% hydrochloric acid (60.7), hydrofluoric acid (3), acetic acid (3.5), diethylene glycol (9), amide-based water repellent (2), Sinol-IKK corrosion inhibitor (TU 2482-002-48482528-98) (2), and process water (19.8).

During displacement, the acid composition was injected to the level of the FS open end. The pressure during displacement of the last portion of ESN into the formation was set at a level not exceeding safe pressure on the casing string.

3) The liquids in the FS (ESN+acid composition) were displaced with an aqueous solution of potassium chloride with a density of 1185 kg/m³ up to the FS open end.

4) The FS valve was closed. No holding time was provided.

Wind-up operations were carried out in accordance with the workover plan.

Third Stage.

After 13 months, a decrease in the oil flow rate of the well by over 25% was observed with a decrease in the productivity factor of over 25% over a period of 6 months.

Technological Operations:

1) ESN was injected in a volume of 1.8 m³/m and the packer was seated in the following sequence:

ESN was injected up to a level of 25 m above the upper perforations of the interval being treated (on average, half of the estimated ESN volume). ESN contains (vol %): diesel fuel (20), emulsifier (3), colloidal solution of hydrophobic silicon dioxide nanoparticles with particle size of 5 to 100 nm (0.8), and an aqueous solution of potassium chloride with a density of 1185 kg/m³ (76.2). The emulsifier contains (vol %): fatty acid aminoamides (45), amine oxide (0.9), high-temperature cross-linking filler (lime) (5) and diesel fuel (49.1). The colloidal solution of hydrophobic silicon dioxide nanoparticles with particle size of 5 to 100 nm contains (vol %): silicon dioxide (31), propylene glycol monomethyl ether (68.7), and water (0.3).

The packer was seated (24 m above the upper perforations).

The remaining ESN volume was injected for further displacement into the interval being treated.

2) ESN in the FS string and the sub-packer area was displaced with a surfactant composition in a volume of 1.2 m³/m. A surfactant composition of the following composition (vol %) was used: monoalkyl phenyl ethers of polyethylene glycol (40.6), sodium alkyliminodipropionates (2.8), polyglycols (15.7), and methanol (40.9).

During displacement, the surfactant composition was injected to the level of the FS open end. The pressure during displacement of the last portion of ESN into the formation was set at a level not exceeding safe pressure on the casing string.

3) The liquids in the FS (ESN+surfactant composition) were displaced with an aqueous solution of potassium chloride with a density of 1190 kg/m³ up to the FS open end.

4) The FS valve was closed and the well was left for 1.5 hours in order for the surfactant composition to react with the rock.

Wind-up operations were carried out in accordance with the workover plan.

As a result of the treatments, an increase in the daily oil flow rate of the well was achieved in the range of 70-83%.

Thus, the invention provides an increase in the thermal stability of the emulsion system, an increase in the rate of development of an oil and gas bearing formation, an increase in the duration of the positive effect, and enhanced oil production.

The invention claimed is:

1. A method of selectively treating a bottom hole region of a formation comprising
a first stage, including a step of injecting an emulsion system into the bottom hole region of the formation, followed by a step of injecting an acid composition into the bottom hole region of the formation, and followed by a step of injecting an aqueous solution of potassium chloride or calcium chloride into the bottom hole region of the formation,
a second stage, including a step of injecting the emulsion system into the bottom hole region of the formation, followed by a step of injecting the acid composition into the bottom hole region of the formation, and followed by a step of injecting the aqueous solution of potassium chloride or calcium chloride into the bottom hole region of the formation,
wherein the second stage is carried out when a productivity factor or a daily oil flow rate of a well has decreased by 25% or more over the preceding 6 months of well operation after the first stage, a third stage, including a step of injecting the emulsion system into the bottom hole region of the formation, followed by a step of injecting a composition of surfactants and alcohols into the bottom hole region of the formation, and followed by a step of injecting the aqueous solution of potassium chloride or calcium chloride into the bottom hole region of the formation, wherein the third stage is carried out when the productivity factor or the daily oil flow rate of the well has decreased by 25% or more over the preceding 6 months of well operation after the second stage, wherein the emulsion system contains (vol %):
diesel fuel—10-20;
emulsifier—3;
a colloidal solution of hydrophobic silicon dioxide nanoparticles with particle size of 5 to 100 nm—0.25-1, or a colloidal solution of hydrophilic silicon dioxide nanoparticles with particle size of 5 to 100 nm—0.25-1, or a hydrophilic dry amorphous silicon dioxide nanoparticles with particle size of 5 to 500 nm—1-2; and
an aqueous solution of calcium chloride or potassium chloride—the rest, wherein if the formation temperature of the bottom hole region of the formation is less than 90° C., the emulsifier is a composition comprising, vol %:
fatty acid aminoamides—43-45;
amine oxide—0.7-1;
diesel fuel—the rest;

and if the formation temperature of the bottom hole region of the formation is over 90° C., the emulsifier is a composition comprising, vol %:
fatty acid aminoamides—43-45;
amine oxide—0.7-1;
lime or bentonite 2-5; and
diesel fuel—the rest, wherein the colloidal solution of hydrophobic silicon dioxide nanoparticles with particle size of 5 to 100 nm contains, vol %:
silicon dioxide—31-32.5;
propylene glycol monomethyl ether—67-68.8;
water—the rest;

wherein the colloidal solution of hydrophilic silicon dioxide nanoparticles with particle size of 5 to 100 nm contains, vol %;
silicon dioxide—30-31 in isopropanol—67-68.5 and in methanol—the rest; or
silicon dioxide—29-31 in ethylene glycol—the rest, wherein the acid composition for carbonate rock of the bottom hole region of a formation contains, vol %:
30% hydrochloric acid—63.5-65;
acetic acid—3.5;
diethylene glycol—8-9;
amide-based water repellent—1.5-2;
corrosion inhibitor—1.5-2; and
process water—the rest, wherein the acid composition for terrigenous rock of the bottom hole region of a formation contains, vol %:
30% hydrochloric acid—60.5-61;
hydrofluoric acid—3-4;
acetic acid—3.3-3.5;
diethylene glycol—8-9;
amide-based water repellent—1.5-2;
corrosion inhibitor—1.8-2; and
process water—the rest, and wherein the composition of surfactants and alcohols contains, vol %:
monoalkyl phenyl ethers of polyethylene glycol—40-41;
sodium alkyliminodipropionates—2.5-3;
polyglycols—15-16; and
methanol—the rest.

* * * * *